United States Patent
Schneider et al.

(10) Patent No.: US 7,062,712 B2
(45) Date of Patent: Jun. 13, 2006

(54) BINDING INTERACTIVE MULTICHANNEL DIGITAL DOCUMENT SYSTEM

(75) Inventors: Tina Fay Schneider, San Francisco, CA (US); Bee Yian Liew, Cupertino, CA (US); Guijun Yang, Pleasanton, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/295,396

(22) Filed: Nov. 15, 2002

(65) Prior Publication Data

US 2003/0192049 A1 Oct. 9, 2003

Related U.S. Application Data

(60) Provisional application No. 60/371,092, filed on Apr. 9, 2002.

(51) Int. Cl.
 *H04N 5/92* (2006.01)
(52) U.S. Cl. .................................. 715/721; 715/804
(58) Field of Classification Search ................ 345/719, 345/738, 762, 854, 74, 720, 744, 745, 747, 345/704, 749, 748, 867, 711, 861; 725/51; 715/704, 711, 853–854, 712, 855, 802–805, 715/762–763, 719–726; 386/46
See application file for complete search history.

(56) References Cited

U.S. PATENT DOCUMENTS

| | | | |
|---|---|---|---|
| 5,870,725 A | | 2/1999 | Bellinger et al. |
| 5,895,455 A | | 4/1999 | Bellinger et al. |
| 5,945,986 A | | 8/1999 | Bargar et al. |
| 6,084,583 A | * | 7/2000 | Gerszberg et al. .......... 345/867 |
| 6,199,076 B1 | * | 3/2001 | Logan et al. ............ 715/501.1 |
| 6,535,909 B1 | * | 3/2003 | Rust ........................... 709/204 |
| 6,606,101 B1 | * | 8/2003 | Malamud et al. ........... 345/715 |
| 6,609,096 B1 | * | 8/2003 | De Bonet et al. ........... 704/500 |
| 6,725,275 B1 | * | 4/2004 | Eyal ........................... 709/231 |
| 6,735,628 B1 | * | 5/2004 | Eyal ........................... 709/223 |
| 2002/0009285 A1 | * | 1/2002 | Safadi et al. .................. 386/46 |
| 2003/0185541 A1 | * | 10/2003 | Green ......................... 386/46 |

OTHER PUBLICATIONS

Schneider, Tina and Smoliar, Stephen William, "A Multi-Channel Infrastructure for Presenting Nonlinear Hypermedia," Multimedia Modeling Conference, Nagano, Japan, Nov. 2000, pp. 1-13.

(Continued)

*Primary Examiner*—Steven P. Sax
(74) *Attorney, Agent, or Firm*—Fliesler Meyer LLP

(57) ABSTRACT

A digital document comprising a multi-channel interface is provided that achieves improved user interaction. The digital document includes a plurality of content channels providing primary content continuously in a looping manner and at least one supplementary channel on a single page. The supplementary channel is configured to provide supplementary content upon the occurrence of an event during playback of the document. Channel content may include video, text, images, web page content and audio. The media content can be managed in a spatial and temporal manner. In addition to media content, a channel may contain interactive regions in the form of hot spots and interactive mapping regions. An authoring tool is also provided for generating a multi-channel interactive digital document.

58 Claims, 15 Drawing Sheets

OTHER PUBLICATIONS

Schneider, Tina and Smoliar, Stephen William, "A Multi-Channel Infrastructure for Presenting Nonlinear Hypermedia," Multimedia Modeling Conference, Nagano, Japan, Nov. 2000, 6 slides.

Schneider, Tina and Smoliar, Stephen William, "Description and Narrative in Hypervideo," Proceedings of the 34th Hawaii International Conference on System Sciences, Jan. 2001, pp. 1-8.

* cited by examiner

900

BINDING INTERACTIVE MULTICHANNEL DIGITAL DOCUMENT SYSTEM

CLAIM TO PRIORITY

The present application claims the benefit of priority under 35 U.S.C. §119(e) to U.S. Provisional Patent Application entitled "SYSTEM FOR GENERATING AND PRESENTING AN INTERACTIVE DIGITAL NARRATIVE", Application No. 60/371,092, filed on Apr. 09, 2002, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to the field of multimedia documents, and more particularly to interactive multi-channel multimedia documents.

BACKGROUND OF THE INVENTION

Communication has evolved to take place in many forms for many purposes. In order to communicate effectively, the presenter must be able to maintain the attention of the message recipient. One method for maintaining the recipient's attention is to make the communication interactive. When a recipient is invited to interact as part of the communicative process, the recipient is likely to pay more attention to the details of the communication in order to interact successfully.

With the development of computers and digital multimedia, the electronic medium has become a popular stage house for narrating stories, generating digital presentations, and other types of communication. Despite the advances in electronics, the art of storytelling as well as communication in general still faces the challenge of finding a way to communicate messages through interaction. For example, print content presentation evolved from lengthy scrolls to bound pages. Digital documents having a variety of media content types need a way to bind content together to present a sense of cohesion. The problem is that most interface designs used in electronic narration applications revolve around undefined multi-layered presentations with no predefined boundaries. New content and storyline sequences are presented to the user through multiple window displays triggered by hyperlinks. This requires a user of an interface to exit one sequence of a story to experience a new sequence. As a result, most interactive narratives are either very linear where interaction is equivalent to turning a page, or non-linear where a user is expected to help author the story. In either case, the prior art does not address the need for binding multiple types of content together in a defined manner. These interactive narratives are overwhelming because a user must keep track of loose and unorganized arrays of windows.

One example of a digital interactive narration is the DVD version of the movie Timecode. Timecode takes a traditional film frame and breaks the screen into four equal and stationary frames. Each of the four frames depicts a segment of a story. A single event, an earthquake, ties the stories together as do the characters as they appear in different screens. The film was generated with the idea that sound presented in the theatrical version of Timecode would be determined by the director and correspond to one of the four channels at various points in the story. The DVD released version of the story contains an audio file for each of the four channels. The viewer may select any one of the four channels and hear the audio corresponding to that channel. The story of the Timecode DVD is presented once while the DVD is played from beginning to end. The DVD provides a yellow highlight in one corner of the frame currently selected by the user. Though a character may appear to move from one channel to another, each channel concentrates on a separate and individual storyline. Channels in the DVD are not combined to provide a larger channel.

The DVD release of Timecode has several disadvantages as an implementation of an interactive interface. These disadvantages stem from the difficulty of transferring a linear movie intended to be driven by a script into an interactive representation of the movie in DVD format. One disadvantage of the DVD release of Timecode involves channel management. When a user selects a frame to hear the audio corresponding to that frame, there is no further information provided by the DVD regarding that frame. Thus, a user is immediately subjected to audio relating to a channel without any context. The user does not know any information about what a character in the story is attempting, thinking, or where the storyline for that channel is heading. Thus, a user must stay focused on that channel for longer periods of time in hope that the audio will illuminate the storyline of the channel.

Yet another disadvantage of the Timecode DVD as a narration is that no method exists for determining the overall plot of the story. None of the channels represent an abstract, long shot, or overview perspective of the characters in the story. As a result, it is difficult for a user to determine what frame displays content that is important to the storyline at different times in the movie. Although a user may rapidly and periodically surf between different channels, there is no guarantee that a user will be able to ascertain what content is most relevant.

Yet another disadvantage of the DVD release of Timecode as an interactive interface is that the channels in the Timecode DVD do not provide any sense of temporal depth. A user can not ascertain the temporal boundaries of the DVD from watching the DVD itself until the movie within the DVD ends. Thus, to ascertain and explore movie content during playback of the movie, a user would have to manually rewind movie scenes to review a scene that was missed in another frame.

Another example of a multimedia interface is a research project called HyperCafe, by Sawhney et al., Georgia Institute of Technology, School of Literature, Communication, and Culture, College of Computing, Atlanta, Ga. HyperCafe replaces textual link properties for video links to create an interactive environment of hyperlinks. Multiple video windows associate different aspects of a continuous narrative. The HyperCafe experience begins with a small number of video windows on a screen. A user may select one of the video windows. Once selected, a new moving window appears displaying content related to the previously selected window. Thus, to receive information about a first video window in HyperCafe, a user may have to engage several windows to view the additional video windows. Further, the video windows move autonomously across a display screen in a choreographed pattern. The technique used is similar to the narrative technique used in several movies, where the camera follows a first character, and then when the first character interacts with a second character, the camera follows the second character in a different direction through the movie. This narrative technique moves the story not through a single plot but through associated links in a story. In HyperCafe, the user can follow an actor in one video window and through another video window follow another actor as the windows move like characters across a screen. The user can also manipulate the story by dragging windows together to help make a narrative connection between the different conversations in the story.

The HyperCafe project has several limitations as an interface. The frames used in HyperCafe provide hyper-video links to new frames or windows. Once a hyper-video link is selected, the new windows appear in the interface replacing the previously selected windows. As a result, a user is required to interact with the interface before having the opportunity to view multiple segments of a storyline.

Another limitation of the HyperCafe project is the moving frames within the interface. The attention of a human is naturally attracted to moving objects. As the frames in the HyperCafe move across the screen, they tend to monopolize the attention of the user. As a result, the user will focus less attention towards the other frames of the interface. This makes the other frames inefficient at providing information while a particular frame is moving within the interface. Further, the HyperCafe presentation has no temporal depth. There is no way to determine the length of the content contained, nor is there a method for reviewing content already presented. Once content, or "conversations", in HyperCafe is presented, they are removed and the user must move forward in time by choosing a hypervideo link representing new content. Also, there is no sense of spatial depth in that the number of windows presenting content to a user is not constant. As hypervideo links are selected by a user, new windows are added to the interface. The presentation of content in HyperCafe is not defined by any structured set of windows. These limitations of the HyperCafe project result from the intention of HyperCafe to present a 'live' performance of a scene at a coffee shop instead of a way of presenting and binding several types of media content to from a presentation.

Further, the hyper-video links may only be selected at certain times within a particular frame. HyperCafe does not provide a way for reviewing what was missed in a previous video sequence nor skipping ahead to the end of a video sequence. The HyperCafe experience is similar to viewing a live stage-like viewing where actors play out a story in real time. Thus, a user is not encouraged to freely experience the content of different frames as the user wishes. To the contrary, a user is required to focus on a particular frame to choose a hyperlink during the designated time the hyperlink is made available to the user.

Yet another example of a multimedia interface is the TED9 report. The TED9 report includes multiple windows and is interactive, it does not provide mapping features, annotation capability, or authoring capability. Further, TED9 over-populates windows by providing for windows that contain multiple video segments and content types for several channels. TED9 manages the multiple video segments by serially displaying images in 2.5 second increments within the channel containing the video segments, wherein each image is a link to the video it represents within the channel. To view a video segment within such a channel, a user must select an image associated with the desired segment at a time when the image is displayed in the channel. Upon selecting an image within this channel, a button appears near the channel prompting the user for further input to view the video segment. Only after providing input to select the image and then input to select the prompt button to play the video is the content presented to a user in those channels. In these channels, TED9 does not allow a user to view one of multiple video segments within a channel without providing input selecting an image and prompt button. Further, TED9 requires selection buttons to navigate its interface and does not provide any dynamic information regarding channel videos and images. When a user selects a video or image in TED9, a one-line title appears below the channel describing the video or image. The title does not change throughout the presentation of the video or image.

What is needed is an interactive narration interface that addresses the limitations and disadvantages of the prior art.

SUMMARY OF THE INVENTION

In one embodiment of the present invention, a digital document comprising an interactive multi-channel interface is provided that binds media content types using spatial and temporal boundaries. The binding element of the document achieves cohesion among document content, which enables a better understanding by and engagement from a user, thereby achieving a higher level of interaction from a user A user may engage the document and explore document boundaries at his or her own pace. The document of the present invention features a single-page interface and media content that may include video, text, images, web page content and audio. In one embodiment, the media content is managed in a spatial and temporal manner.

In one embodiment, a digital document includes a multi-channel interface that can present media simultaneously along a multi-dimensional grid in a continuous loop. Additional media content is activated through user interaction with the channels. In one embodiment, the selection of a content channel having media content initiates the presentation of supplementary content in supplementary channels. In another embodiment, selection of hot spots or the selection of an enabled mapping object in a map channel may also trigger the presentation of supplementary content or the performance of an action within the document Channels may display content relating to different aspects of a presentation, such as characters, places, objects, or other information that can be represented using multimedia.

The digital document of the present invention may be defined by boundaries. A boundary allows a user of the document to perceive a sense of depth in the document. In one embodiment, a boundary may relate to spatial depth. In this embodiment, the document may include a grid of multiple channels on a single page. The document provides content to a user through the channels. The channels may be placed in rows, columns or in some other manner. In this embodiment, content is not provided outside the multi-channel grid. Thus, the spatial boundary provides a single 'page' format using a multi-channel grid to arrange content.

In another embodiment, the boundary may relate to temporal depth. In one embodiment, temporal depth is provided as the document displays content continuously and repetitively within the multiple channels. Thus, in one embodiment, the document may repetitively provide sound, text, images, or video in one or more channels of the multi-channel grid where time acts as part of the interface The repetitive element provides a sense of temporal depth by informing the user of the amount of content provided in a channel.

In yet another embodiment, the digital document supports a redundancy element. Both the spatial and temporal boundaries of the document may contribute to the redundancy element. As a user interacts with the document and perceives the boundaries of the document, the user learns a predictability element present within the document. The spatial boundary may provide predictability as all document content is provided on a multi-channel grid located on a single page. The temporal boundary may provide predictability as content is provided repetitively. The perceived predictability allows the user to become more comfortable with the document and achieve a better and more efficient perception of document content.

In yet another embodiment, the boundaries of the document of the present invention serve to bind media content into a defined document for presenting multi-media. In one embodiment, the document is defined as a digital document having a multi-channel grid on a single page, wherein each channel provides content. The channels may provide media content including video, audio, web page content, images, or text. The single page multi-channel grid along with the temporal depth of the content presented act to bind media content together in a cohesive manner.

The document of the present invention represents a new genre for multi-media documents. The new genre stems from a digital defined document for communication using a variety of media types, all included within the boundary of a defined document. A document-authoring tool allows an author to provide customized depth and content directly into a document of the new genre.

In one embodiment, the present invention includes a tool for generating a digital defined document. The tool includes an interface that allows a user to generate a document defined by boundaries and having an element of redundancy. The interface is easy to use and allows users to provide customized depth and content directly into a document.

The digital document of the present invention is adaptable for use in many applications. The document may be implemented as an interactive narration, educational tool, training tool, advertising tool, business planning or communication tool, or any other application where communication may be enhanced using multi-media presented in multiple channels of information The boundary-defined media-binding document of the present invention is developed in response to the recognition that human physiological senses uses familiarity and predictability to perceive and process multiple signals simultaneously. People may focus senses such as sight and hearing to determine patterns and boundaries in the environment. With the sense of vision, people are naturally equipped to detect peripheral movement and detect details from a centrally focused object. Once patterns and consistencies are detected in an environment and determined to predictably not change in any material manner, people develop a knowledge and resulting comfort with the patterns and consistencies which allow them to focus on other 'new' information or elements from the environment. Thus, in one embodiment, the digital document of the present invention binds media content in a manner such that a user may interact with multiple displays of information while still maintaining a high level of comprehension because the document provides stationary spatial boundaries through the multi-grid layout, thereby allowing the user to focus on the content contained within the document boundaries.

DETAILED DESCRIPTION

In one embodiment of the present invention, a digital document comprising an interactive multi-channel interface is provided that binds video, text, images, web page content and audio media content types using spatial and temporal boundaries. The binding element of the document achieves cohesion among document content, which enables a better understanding by and engagement from a user, thereby achieving a higher level of engagement from a user A user may interact with the document and explore document boundaries and document depth at his or her own pace and in a procession chosen by the user. The document of the present invention features a single-page interface with customized depth of media content that may include video, text, one or more images, web page content and audio. In one embodiment, the media content is managed in a spatial and temporal manner using the content itself and time. The content in the multi-channel digital document may repeat in a looping pattern to allow a user the chance to experience the different content associated with each channel. The boundaries of the document that bind the media together provide information and comfort to a user as the user becomes familiar with the spatial and temporal layout of the content allowing the user to focus on the content instead of the interface. In another embodiment, the system of the present invention allows an author to create an interactive multi-channel digital document.

Figure 1:
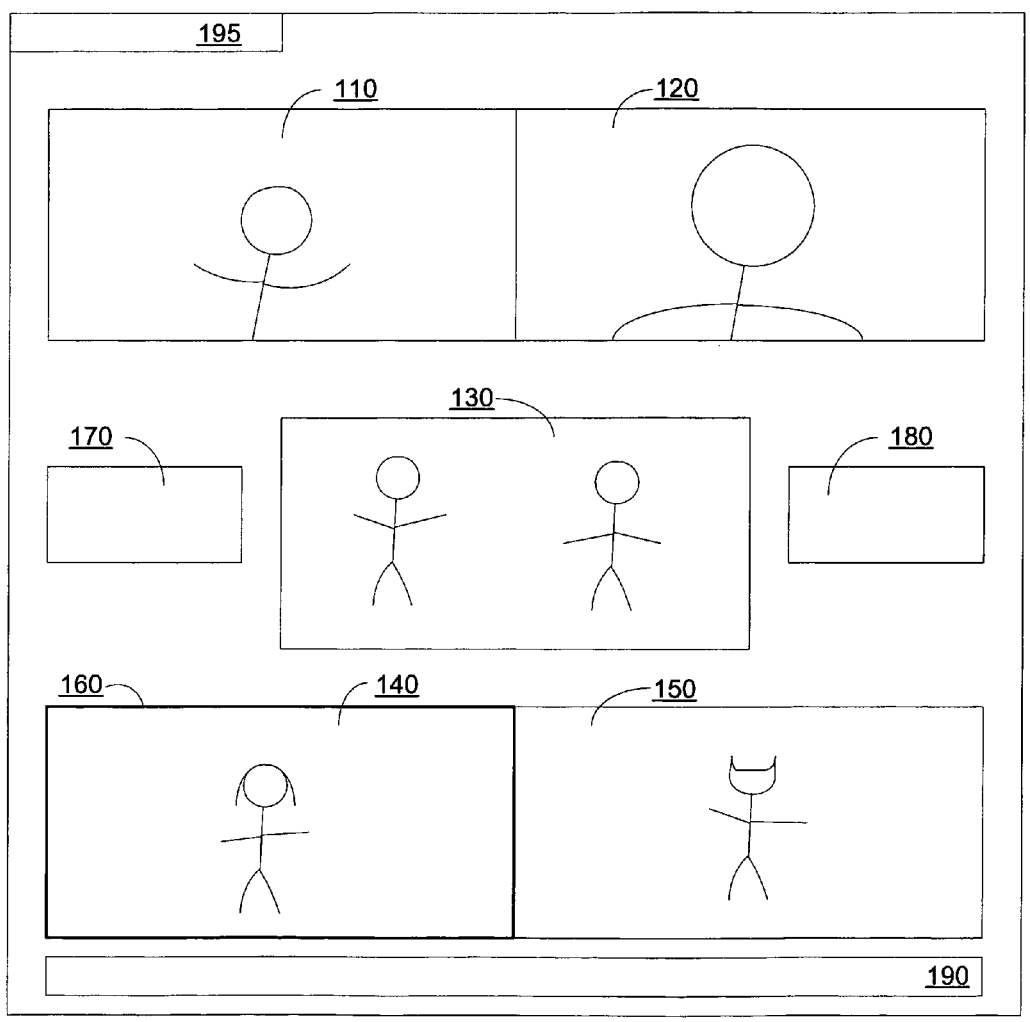
FIG. 1 is a diagram of an interactive multichannel document in accordance with one embodiment of the present invention.

FIG. 1 is a diagram of an interactive multi-channel document 100 in accordance with one embodiment of the present invention. The document is comprised of an interface 100 that includes content channels 110, 120, 130, 140, and 150. The content channels may be used to present media including video, audio, images, web page content and text. The interface also includes supplementary channels 170 and 180. Similar to the content channels, the supplementary channels may be used to present video, audio, images, web page content and text. Though five content channels and two supplemental channels are shown, the number and placement of the content channels and supplementary channels may vary according to the desire of the author of the interface. The audio presented within a content or supplementary channel may be part of a video file or a separate audio file. Interactive multi-channel interface 100 also includes channel highlight frame 160, optional control bar 190, and information window 195. In one embodiment, a background sound channel is also provided. A background sound channel may or may not be visually represented on the interface (not shown in FIG. 1).

An interactive multi-channel interface in accordance with one embodiment of the present invention may have several features. One feature of the present invention is that all content is presented on a single page. A user of the multi-channel interface does not need to traverse multiple pages when exploring new content. The changing content is organized and provided in a single area. Within any content channel, the content may change automatically, through the interactions of the user, or both. In one embodiment, the interface consists of a multi-dimensional grid of channels. In one embodiment, the author of the narration may configure the size and layout of the channels. In another embodiment, an author may configure the size of the channels, but all channels are of the same size. A channel may present media including video, text, one or more images, audio, web page content, or a combination of these media types. Additional audio, video, image, images, web page content and text may be associated with the channel content and brought to the foreground through interaction by the user.

In another embodiment of the present invention, the multi-channel interface uses content and the multi-grid layout in a rhythmic, time-based manner for displaying information. In one embodiment, content such as videos may be presented in single or multiple layers. When only one layer of content is displayed, each video channel will play continuously in a loop. This allows users to receive information on a periphery basis from a variety of channels without having playback of the document end upon the completion of a video. The loop automatically repeats until a user provides input indicating that playback of the document shall end.

The digital document of the present invention may be defined by boundaries. A boundary allows a user of the document to perceive a sense of depth in the document. In one embodiment, a boundary may relate to spatial depth. In this embodiment, the document may include a grid of multiple channels on a single page. The document provides content to a user through the channels. The channels may be placed in rows, columns or in some other manner. In this embodiment, content is not provided outside the multi-channel grid. Thus, the spatial boundary provides a single 'page' format using a multi-channel grid to arrange content.

In another embodiment, the boundary may relate to temporal depth. In one embodiment, temporal depth is provided as the document displays content continuously and repetitively within the multiple channels. Thus, in one embodiment, the document may repetitively provide sound, text, images, or video in one or more channels of the multi-channel grid where time acts as part of the interface The repetitive element provides a sense of temporal depth by informing the user of the amount of content provided in a channel.

In yet another embodiment, the digital document supports a redundancy element. Both the spatial and temporal boundaries of the document may contribute to the redundancy element. As a user interacts with the document and perceives the boundaries of the document, the user learns a predictability element present within the document. The spatial boundary may provide predictability as all document content is provided on a multi-channel grid located on a single page. The temporal boundary may provide predictability as content is provided repetitively. The perceived predictability allows the user to become more comfortable with the document and achieve a better and more efficient perception of document content.

In yet another embodiment, the boundaries of the document of the present invention serve to bind media content into a defined document for presenting multi-media. In one embodiment, the document is defined as a digital document having a multi-channel grid on a single page, wherein each channel provides content. The channels may provide media content including video, audio, web page content, images, or text. The single page multi-channel grid along with the temporal depth of the content presented act to bind media content together in a cohesive manner.

The document of the present invention represents a new genre for multi-media documents. The new genre stems from a digital defined document for communication using a variety of media types, all included within the boundary of a defined document. A document-authoring tool allows an author to provide customized depth and content directly into a document of the new genre.

In one embodiment, the present invention includes a tool for generating a digital defined document. The tool includes an interface that allows a user to generate a document defined by boundaries and having an element of redundancy. The interface is easy to use and allows users to provide customized depth and content directly into a document.

The digital document of the present invention is adaptable for use in many applications. The document may be implemented as an interactive narration, educational tool, training tool, advertising tool, business planning or communication tool, or any other application where communication may be enhanced using multi-media presented in multiple channels of information The boundary-defined media-binding document of the present invention is developed in response to the recognition that human physiological senses uses familiarity and predictability to perceive and process multiple signals simultaneously. People may focus senses such as sight and hearing to determine patterns and boundaries in the environment. With the sense of vision, people are naturally equipped to detect peripheral movement and detect details from a centrally focused object. Once patterns and consistencies are detected in an environment and determined to predictably not change in any material manner, people develop a knowledge and resulting comfort with the patterns and consistencies which allow them to focus on other 'new' information or elements from the environment. Thus, in one embodiment, the digital document of the present invention binds media content in a manner such that a user may interact with multiple displays of information while still maintaining a high level of comprehension because the document provides stationary spatial boundaries through the multi-grid layout, thereby allowing the user to focus on the content contained within the document boundaries.

In one embodiment, when multiple layers of content are to be displayed on a channel, the interface organizes the content by displaying multiple images on the channel. Each image may correspond to a layer of content. For example, an interface may consist of nine channels. Each channel may display three videos. In one embodiment of the present invention, an image may be used to represent each video. Thus, each channel may display three images corresponding to the three videos associated with that channel. In one embodiment, a channel may display the three images sequentially in a looping pattern. In another embodiment, a channel may display shorter video sequences that represent the original videos. In this case, the representative video system could be played sequentially in a looping pattern. The author of the narrative interface may configure a channel such that images displayed by the channel are displayed for different periods of time. In this manner, the author of the interface may construct a rhythmic, time-based interface.

In another embodiment, the author may configure an interface such that user input provided through an input device affects the rhythm of the sequential looping pattern of a channel. For example, placing a cursor over a channel or otherwise selecting a particular channel may cause images associated with that channel to be displayed for a shorter period of time. This will allow a user who is familiar with a pattern of images to more quickly cycle through the images associated with a channel.

In one embodiment, audio is another source of information that the user explores as the user experiences a document of the present invention. In one embodiment, there are multiple layers of audio presented to the user of the interface. One layer of audio may be associated with an individual content channel. In this case, when multiple channels are presented in an interface and a user selects a particular channel, audio corresponding to the selected channel may be presented to the user. In one embodiment, the audio corresponding to a particular channel is only engaged while the channel is selected. Once a user selects a different channel, the audio of the newly selected channel is activated. When a new channel is activated, the audio corresponding to the previously selected channel may end or reduce in volume. Examples of audio corresponding to a particular channel may include dialogue, non-dialogue audio effects and music corresponding to the video content presented in a channel.

Another audio layer in one embodiment of the present invention may be a universal or background layer of audio. Background audio may be configured by the author and continue throughout playback of the document regardless of what channel is currently selected by a user. Examples of the background audio include speech narration, music, and other types of audio. The background audio layer may be chosen to bring the channels of an interface into one collective experience. In one embodiment of the present invention, the background audio may be chosen to enhance events such as an introduction, conclusion, foreshadowing events or the climax of a story. Background audio is provided through a background audio channel provided in the interface of the present invention.

In one embodiment, the content channels are used to collectively narrate a story. For example, the content channels may display video sequences. Each channel may present a video sequence that narrates a portion of the story. For example, three different channels may focus on three different characters featured in a story. Another channel may present a video sequence regarding an important location in the story, such as a location where the characters reside throughout the story or any other aspect of the story that can be represented visually. Yet another channel may provide an overview or long shot perspective. The long shot perspective may show content featured in multiple channels, such as the characters featured in those channels. In the embodiment shown in FIG. 1, channels 110, 120, and 140 relate to a single character and channel 150 relates to a creature. In the embodiment shown in FIG. 1, channel 130 relates to a long shot view of the characters depicted in channels 110 and 120 at the current time in the narration. In one embodiment, the video sequences of each channel are synchronized in time such that what is appearing to occur in one channel is happening at the same time as what is appearing to occur in the other content channels. In one embodiment, the channels do not adjust in size and do not migrate across the interface. A user of the narration interface may interact with the interface by selecting a particular content channel. When selected, each content channel presents information regarding the content channels video segment through the supplemental channels.

In another embodiment, the content channels are used to collectively provide information regarding some common theme or subject matter. The subject matter may be presented in the form of a tutorial, an advertisement, an examination or test, a catalog, a multi-channel video, a professional presentation, or a game.

The supplemental channels provide supplementary information. The channels may be placed in locations as chosen by the interface author or at pre-configured locations. In one embodiment, supplemental channels provide media content upon the occurrence of an event during document playback. The event may be the selection of the supplemental channel, selection of a content channel, expiration of a timer, selection of a hot spot, selection of a mapping object or some other event. The supplementary channel media content may correspond to a content channel selected by the user at the current playback time of the document. Thus, the media content provided by the supplementary channels may change over time for each channel. The content may address an overview of what is happening in the selected channel, what a particular character in the selected frame is thinking or feeling, or provide some other information relating to the selected channel. This provides a user with a context for what is happening in the selected channel. In another embodiment, the supplemental channels may provide content that conveys something that happened in the past, something that a character is thinking, or other information as determined by the author of the interface. The supplemental channels may also be configured to provide a forward, credits, or background information within the document. Supplementary channels can be implemented as a separate channel as shown in FIG. 1, or within a content channel. When implemented within a content channel, media content may be displayed within the content channel when a user selects the content channel.

The content channels can be configured in many ways to further secure the attention of the user and enhance the user's understanding of the information provided. In one embodiment, a content channel may be configured to provide video from the perspective of a long distance point of view. This "long distance shot" may encapsulate multiple main characters, an important location, or some other subject of the narration. While one frame may focus on multiple main characters, another frame may focus on one of the characters more specifically. This provides a mirror-type effect between the two channels. This assists to bring the channels together as one story and is very effective in relating multiple screens together at different points in the story. A long distance shot is shown in the center channel of FIG. 1.

In accordance with another embodiment of the present invention, characters and scenes may line up visually across two channels. In this case, a character could seamlessly move across two or more channels as if it were moving in one channel. In another embodiment, two adjoining channels may have content that make the channels appear to be a single channel. Thus, the content of two adjoining channels may each show one half of a video or object to make the two channels appear as one channel.

A user may interact with the multi-channel interface by selecting a channel. To select a channel, the user provides input through an input device. An input device as used herein is defined to include a mouse device, keyboard, numerical keypad, touch-screen monitor, voice recognition system, joystick, game controller, a personal digital assistant (PDA) or some other input device enabled to generate an input event signal. In one embodiment, once a user has selected a channel, a visual representation will indicate that the channel has been selected. In one embodiment, the border of the selected channel is highlighted. In the embodiment shown in FIG. 1, the border 160 of content channel 140 is highlighted to indicate that channel 140 is currently selected. Upon selecting a content channel, the supplementary channels can be used to provide media or information in some other form regarding the selected channel. In one embodiment, sound relating to the selected channel at the particular time in the narration is also provided. The interactive narration interface may be configured to allow a user to start, stop, rewind, fast forward, step through and pause the narration interface with the input device. In an embodiment where the input device is a mouse, a user may select a channel by using a mouse to move a cursor into the channel and pause playback of the document by clicking on the channel. A user may restart document playback by clicking a second time on the selected channel or by using a control bar such as optional control bar 190 in FIG. 1. A particular document may not contain a control bar, have each video display its own control bar, or have one control bar for all video channels simultaneously. In one embodiment, if there is one story, presentation, theme or related subject matter that is to be displayed across multiple channels, such as in a traditional one-plot narrative, then a single control bar may control all of the channels simultaneously.

Figure 2:
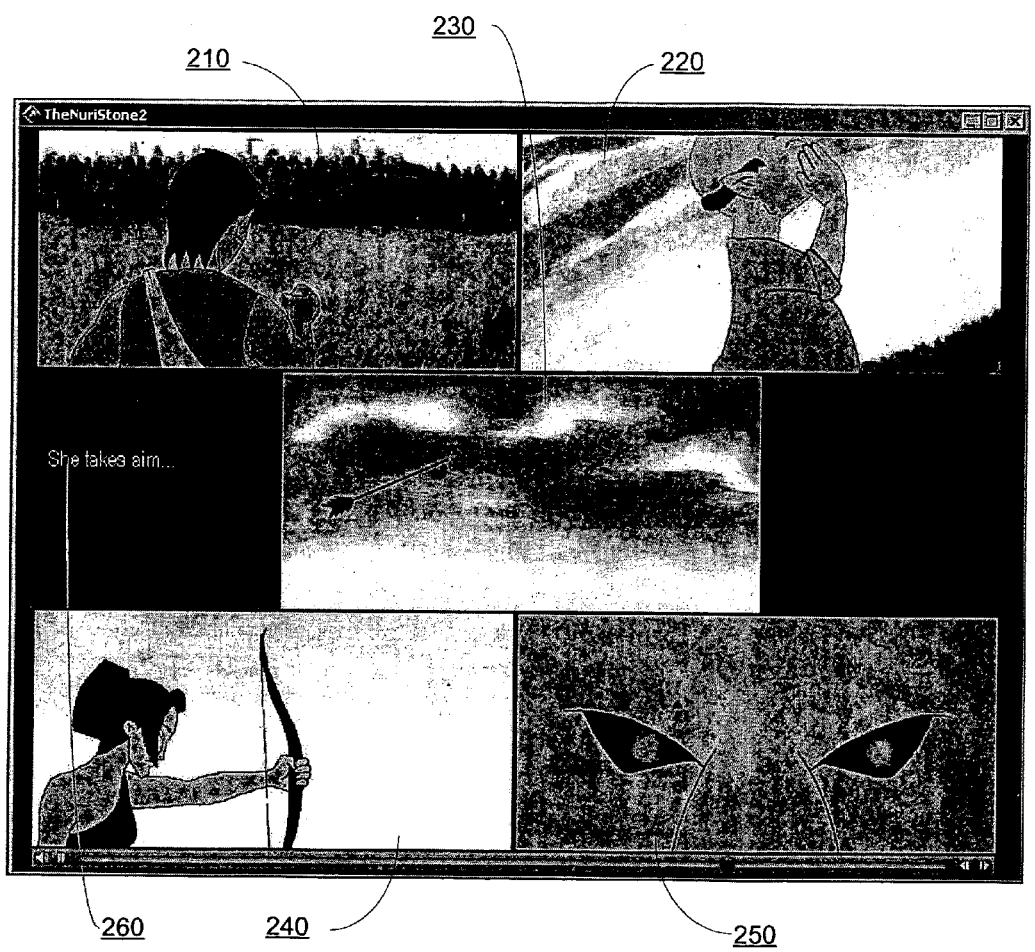
FIG. 2 illustrates a digital interactive multichannel document as displayed on a display screen in accordance with one embodiment of the present invention.

FIG. 2 illustrates an interactive narration interface 200 where the content channels contain animated video in accordance with one embodiment of the present invention. As shown in FIG. 2, the interface 200 includes content channels 210, 220, 230, 240, and 250 and supplemental channel 260. Content channel 230 shows an arrow in mid-flight, an important aspect of the narration at the particular time. Content channel 240 is currently selected by a user and highlighted by a colored border. The animation of channel 240 depicts a character holding a bow, and text displayed in supplementary channel 260 regarding the actions of the character. Content channels 210 and 220 depict other human characters in the narration while content channel 250 depicts a creature.

Figure 3:
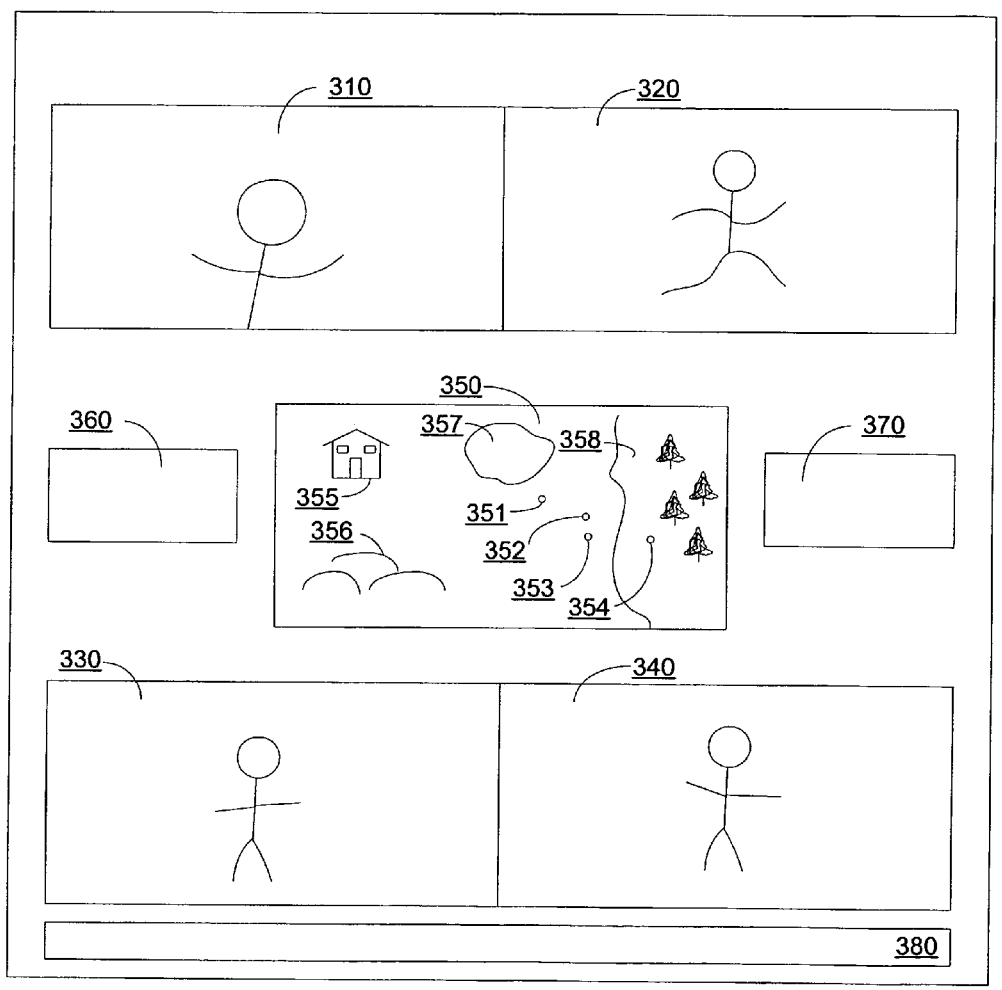
FIG. 3 is a diagram of an interactive multichannel document having a mapping frame in accordance with one embodiment of the present invention.

In one embodiment of the present invention, a content channel may be used as a map channel to present information relating to the geographical location of objects in the narration. For example, a content channel may resemble a map. FIG. 3 is a diagram of an interactive narration system interface 300 having a mapping frame in accordance with one embodiment of the present invention. Interface 300 includes content channels 310, 320, 330, 340, and 350, supplemental channels 360 and 370, and an optional control bar 380. Content channels 310–340 relate to characters in the narration and content channel 350 is a map channel. Map channel 350 includes character indicators 351–354, object representations 355–357, and terrain shading 358.

In the embodiment shown in FIG. 3, the map channel presents an overview of a geographical area. The geographical area may be a view of the entire landscape where narration takes place, a portion of the entire landscape, or some other geographical representation. In one embodiment, the map may provide a view of only a portion of the total landscape involved in a narration in the beginning of the narration and expand as a character moved around the landscape. Within the map channel are several indicators and icons. In one embodiment, a character indicator corresponds to a major character in the narration. Selecting a character indicator may provide information regarding the character such as biographical information. For each character indicator, there may be a content channel displaying video of the corresponding character. In FIG. 3, character indicators 351–354 correspond to the characters of content channels 310, 320, 330 and 340. As a character moves, details regarding the movements may be depicted in its respective content channel. The map channel would depict the movement in relation to a larger geographic area. Thus, as the character in map channel 320 runs, a corresponding character indicator 352 moves in the map of map channel 350. Further, the character indicators may vary throughout a story depending upon the narration. For example, a character indicator may take the form of a red dot. If a character dies, the dot may turn gray, a light red, or some other color. Alternatively, a character indicator may change shape. In the case of a character's death, the indicator may change from a red dot to a red "x". Multiple variations of depicting characters on a map are possible, all of which are considered within the scope of the present invention.

The map channel may also include object representations. Object representations may include points of interest in the narration such as a house 355, hills 356, or a lake 357. Further, a map depicted in the map channel may indicate different types of terrain or properties of specific areas. For example, a forest may be depicted as a colored area such as colored area 358. A user may provide input that selects object representations. Once the object representations are selected, background information on the objects such as the object representation history may be provided in the content or supplemental channels. Any number of object representations and indicators could be depicted in the map channel depending upon the type of narration being presented, all of which are considered within the scope of the present invention.

In another embodiment of the present invention, the map channel may depict movement of at least one object over a time period during document playback. The object may represent anything that is configured to change positions over time elapsed during document playback. The object may or may not correspond to a content channel. For example, the map channel may be implemented as a graph that shows the fluctuation of a value over time. The value may be a stock price, income, change in opinion, or any other quantifiable value. In this embodiment, an object in a map channel may be associated with a content channel displaying information related to the object. Related information may include company information or news when mapping stock price objects, news clips or developments when mapping changes in opinion, or other information to give a background or further information regarding a mapped value. In another embodiment, the map channel can be used as a navigational guide for users exploring the digital document.

Similar to the interactive properties of the channels discussed in relation to FIG. 1, media content can be brought to the foreground according to the selection of an object or a particular character indicator in a map channel. In one embodiment of the present invention, a user may select a character indicator within the map channel. Upon selecting a character indicator, a content channel will automatically be selected that relates to the character indicator selected by the user. In one embodiment, a visual indicator will indicate that the content channel has been selected. The visual indicator may include a highlighted border around the content channel or some other visual indicator. In an embodiment, a visual indicator may also appear indicating a character indicator has been selected. The visual indicator in this case may include a border around the character indicator or some other visual signal. In any case, once a character indicator is selected, supplemental media content corresponding to the particular character may be presented in the supplemental channels.

In one embodiment, the map channel is essentially the concept tool of the multi channel digital document. It allows many layers, multiple facets or different clusters of information to be presented without over crowding or complicating the single page interface. In an embodiment, the digital document is made up of two or more segments of stories; the map channel can be used to bring about the transition of one segment to another. As the story transitions from one segment to another, one or more of the channels might be involved in presenting the transition. The content in the affected channels may change or go empty as designed. The existence of the map channel helps the user to maintain the big picture and the current context as the transition takes place.

Figure 4:
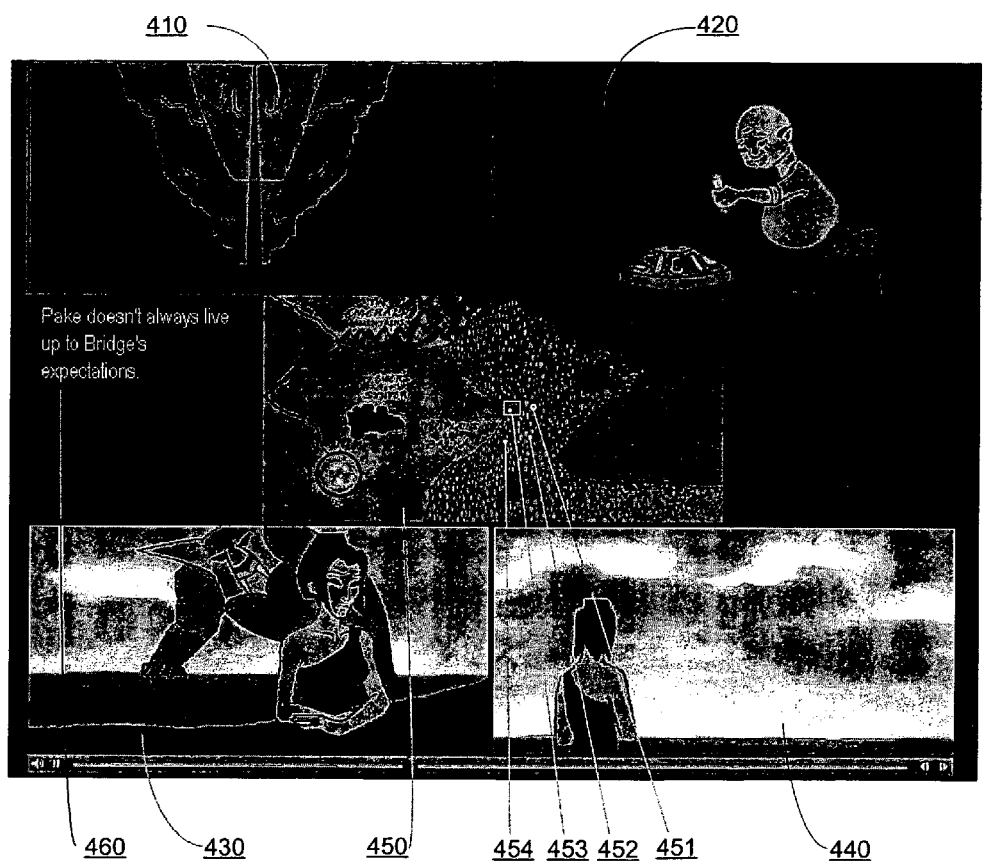
FIG. 4 illustrates a digital interactive multichannel document having a mapping frame as displayed on a display screen in accordance with one embodiment of the present invention.

FIG. 4 illustrates an interactive narration interface 400 where the content channels contain animated video having a map channel in accordance with one embodiment of the present invention. Interface 400 includes content channels 410, 420, 430, and 440, map channel 450, and supplemental channel 460. In the embodiment shown, the map channel includes object representations such as a direction indicator, a castle, mountains, and a forest. Text is also included within the map channel to provide information regarding objects located on the map. Map channel also includes character indicators 451, 452, 453, and 454. In the embodiment shown, each character indicator in the map channel corresponds to a character featured in a surrounding content channel. In the embodiment shown in FIG. 4, the character featured in content channel 410 corresponds to character indicator 453. As shown, character indicator 453 has been selected, as indicated by the highlighted border around the indicator in the map channel. Accordingly, content channel 410 is also selected by a highlighted border because of the association with between channel 410 and the selected character indicator. In the embodiment shown, text displayed in supplemental channel 460 corresponds to character indicator 453 at the current time in the narration.

Figure 5:
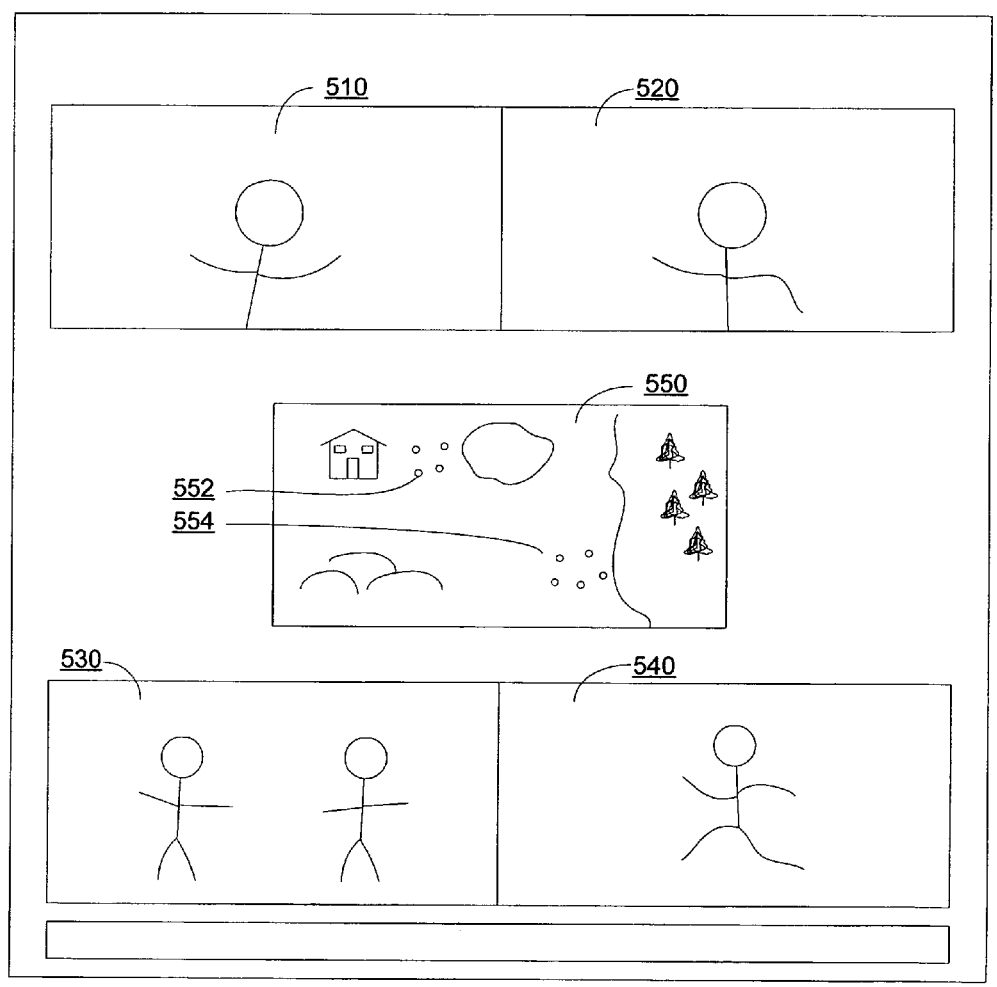
FIG. 5 is a diagram of an interactive multichannel document having a mapping frame and multiple object groups in accordance with one embodiment of the present invention.

In yet another embodiment, there may not be content channels for all the characters, places or objects featured in a story or other type of presentation. This may be a result of author design or impracticality of having numerous channels on a single interface. In this situation, content channels may be delegated to different characters or objects based on certain criteria. In one embodiment of the present invention, available content channels may be delegated to a group of characters that are related in some way, such as those positioned in the same geographic area in the map channel. In one embodiment, the interface may be configured to allow a user to select a group of characters. FIG. 5 is a diagram of an interactive narration interface 500 having two groups of characters in the map channel 550, group 552 and group 554. In FIG. 5, the user may select either group 552 or 554. Upon selecting a particular group, content related to those characters may be provided in the content channels of the interface. In an embodiment, if a user provided input to select a second group while content relating to a first group was currently displayed in the content channels, the content channels would then display content associated with the second group. In another embodiment, a user could distinguish between selecting content channel or supplemental channel content regarding a group. For example, a first group may currently be selected by a user. A user may then provide a first input to obtain supplemental content related to a second group, such as video, audio, text and sound. In this embodiment, the content channels would display content related to the first group while the supplemental channels provide content related to the second group. A user would only generate content in the content channels relating to the second group when the user provided a second input. In one embodiment, the input device may be a mouse. In this case, a user may generate a first input by using the mouse to place a cursor over the first group on the map channel. The user may generate the second input by using the mouse to place the cursor over the second group in the map channel and then depressing a mouse button. Other input devices could also be used to provide input to mapping characters, all of which are considered to be within the scope of the present invention.

Figure 6:
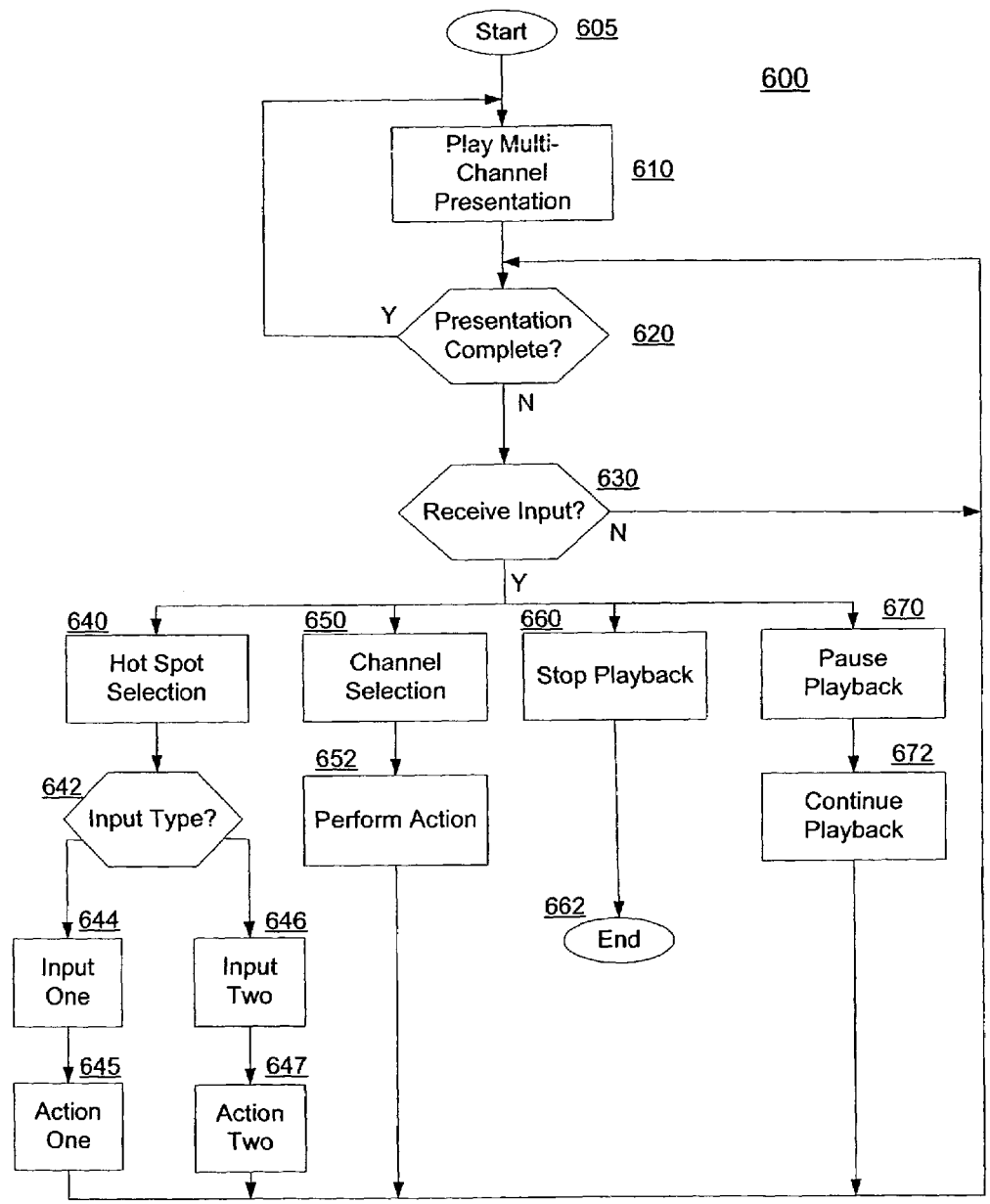
FIG. 6 illustrates a method for executing a interactive multi-channel digital document in accordance with one embodiment of the present invention.

A method 600 for playback of an interactive multi-channel document in accordance with one embodiment of the present invention is illustrated in FIG. 6. Method 600 begins with start step 605. Playback of the multi-channel interface is then initiated in step 610.

In one embodiment, the system of the present invention may have a project file currently in cache memory that can be executed. This may occur if a project file has been previously opened, created, or edited by a user. In one embodiment, a user initiates playback by providing input to the interface. In the embodiment shown in FIG. 10, a "play" button on the interface may be selected by a user to initiate playback of the document. In this case, upon receiving input from a user indicating that playback of the document should begin, the system configures any media objects and commences playback of the document. Operation then continues to step 620. In another embodiment, the system of the present invention has no project file in memory. In this case, the system must first receive a project file before executing an interactive multi-channel interface. In another embodiment, the document exists as an executable file. In this case, a user may initiate playback by running the executable file. Upon running the executable, the project file is placed into cache memory of the computer. The project file may be a text file, binary file, or in some other format. The project file contains information in a structured format regarding stage, scene and channel settings, as well as subject matter corresponding to different channels. An example of a project file in accordance with one embodiment of the present invention is shown below:

```
2
[stage size]
800
600
[stage position]
111
8
[main controller shown]
true
[number of medias]
4
[stage background color]
−12566464
[screen highlighter color]
−65536
[screen background color]
−16777216
[scripts color]
[forward color]
[scripts font]
[forward font]
[volume level]
3
[synchronize loop]
false
0
[forward]
0
[credits]
0
[background sound]
[Type of movie screens]
[Type of screen 0]
0
[Type of screen 1]
4
[Type of screen 2]
2
[Type of screen 3]
5
[Media source of movie screens]
[Media source of screen 0]
0
[Media source of screen 1]
0
[Media source of screen 2]
0
[Media source of screen 3]
0
[Description of movie screens]
[Description of screen 0]
cook FINAL-compressed.avi
[Description of screen 1]
1 bolder.jpg
[Description of screen 2]
credit pict 1 copy.jpg
[Description of screen 3]
install.txt
[Border of movie screens]
[Border of screen 0]
0
[Border of screen 1]
1
[Border of screen 2]
```

-continued

```
0
[Border of screen 3]
0
[Preload of movie screens]
[Preload of movie screen 0]
true
[Preload of movie screen 1]
false
[Preload of movie screen 2]
false
[Preload of movie screen 3]
false
[hotspot redframe of movie screens]
[hotspot redframe of screen 0]
false
[hotspot redframe of screen 1]
false
[hotspot redframe of screen 2]
false
[hotspot redframe of screen 3]
false
[narration shown of movie screens]
[narration shown of screen 0]
true
[narration shown of screen 1]
false
[narration shown of screen 2]
false
[narration shown of screen 3]
false
[Title shown of movie screens]
[Title shown of screen 0]
0
[Title shown of screen 1]
1
[Title shown of screen 2]
0
[Title shown of screen 3]
0
[Border color of movie screens]
[Border color of movie screen 0]
−6724352
[Border color of movie screen 1]
−6724352
[Border color of movie screen 2]
−6724352
[Border color of movie screen 3]
−6724352
[Header text color of movie screens]
[Header text color of movie screen 0]
−1
[Header text color of movie screen 1]
−1
[Header text color of movie screen 2]
−1
[Header text color of movie screen 3]
−1
[Header text font of movie screens]
[Header text font of movie screen 0]
Arial
0
12
[Header text font of movie screen 1]
Arial
0
12
[Header text font of movie screen 2]
Arial
0
12
[Header text font of movie screen 3]
Arial
0
12
[Time unit of movie screens]
[Time unit of screen 0]
0
[Time unit of screen 1]
0
```

-continued

```
[Time unit of screen 2]
0
[Time unit of screen 3]
0
[media URL for movie screens]
[media URL for screen 0]
cook FINAL-compressed.avi
[media URL for screen 1]
1 bolder.jpg | 2 bolder.jpg | 3 bolder.jpg
[media URL for screen 2]
credit pict 1 copy.jpg
[media URL for screen 3]
install.txt
[narration data for movie screens]
[narration data for movie screen 0]
4
1 2.089977324 "narration text 1"
2 19.340115968000003 "narration text 2"
3 22.624197601000002 " "
4 38.680231936000006 "Good Bye"
[narration data for movie screen 1]
0
[narration data for movie screen 2]
0
[narration data for movie screen 3]
0
[map data for movie screens]
[map data for movie screen 0]
1
1 0.0 0.0 0.0
[map data for movie screen 1]
0
[map data for movie screen 2]
0
[map data for movie screen 3]
0
[hotspot data for movie screens]
[hotspot data for movie screen 0]
1
1   29.040943310000003   53.358550623000006   0.6692708333333334
0.75   0.7942708333333334 0.1951219512195122 25.0 "Trigger Movie"
0
1
1 credit pict 1 copy.jpg
0
0
0
false
[hotspot data for movie screen 1]
0
[hotspot data for movie screen 2]
2
1 0.125 0.14634146341463414 0.265625 0.4146341463414634
"Trigger Movie"
0
1
3 1 bolder.jpg
0
0
0
false
2 0.5078125 0.36585365853658536 0.8229166666666666
0.8414634146341463 "Exit"
[hotspot data for movie screen 3]
0
[loop data for movie screens]
[loop data for movie screen 0]
3
0.0
10.0
11.0
[loop data for movie screen 1]
[loop data for movie screen 2]
[loop data for movie screen 3]
[map channel of movie screens]
[map channel of screen 0]
[map channel of screen 1]
[map channel of screen 2]
[map channel of screen 3]
```

```
[Image type of movie screens]
[Image type of screen 0]
[Image type of screen 1]
[Image type of screen 2]
0
[Image type of screen 3]
[maintain aspect ratio of movie screens]
[maintain aspect ratio of screen 0]
[maintain aspect ratio of screen 1]
[maintain aspect ratio of screen 2]
true
[maintain aspect ratio of screen 3]
[scripts background for movie screens]
[scripts background for movie screen 0]
−16777216
[scripts background for movie screen 1]
[scripts background for movie screen 2]
[scripts background for movie screen 3]
−1
[scripts foreground for movie screens]
[scripts foreground for movie screen 0]
−1453426
[scripts foreground for movie screen 1]
[scripts foreground for movie screen 2]
[scripts foreground for movie screen 3]
−16777216
[scripts font for movie screens]
[scripts font for movie screen 0]
Arial
0
12
[scripts font for movie screen 1]
[scripts font for movie screen 2]
[scripts font for movie screen 3]
Arial
0
12
[Scenes data of project]
1
4
WorkingScene
0 cook FINAL-compressed.avi
1 1 bolder.jpg
2 credit pict 1 copy.jpg
3 install.txt
[scene on the stage when started]
0
[medias on the stage when started]
cook FINAL-compressed.avi
1 bolder.jpg
credit pict 1 copy.jpg
install.txt
```

The project file above is only an example of one possible project file and not intended to limit the scope of the present invention. In one embodiment, upon receiving a project file, the project file is parsed by project file management system 750 to read the channel content, properties and stage preferences into memory. In another embodiment, the project file is parsed by channel editor system 740, stage editor system 730 or another system to retrieve the channel and stage information. Once parsed, the data contained in the project file is used to configure a document to be played by playback system 760 of the system. In one embodiment, the content, properties and preferences retrieved from the parsed project file are stored in cache memory. The stored content, properties and preferences can then be accessed and managed by playback system 760 of FIG. 7 to playback an interactive digital document Channel content can be managed during document playback in several ways in accordance with the present invention. In one embodiment, channel content is preloaded. In this case, all channel content is loaded before the document is played back. Thus, at a time just before document playback begins, the document and all document content is located locally on the machine. In another embodiment, only multi-media files such as video are loaded prior to document playback. The files may be loaded into cache memory from a computer hard disk, from over a network, or some other source. Preloading of channel content uses more memory than channel content on request method, but may be desirable for slower processors that wouldn't be able to keep up with channel content requests during playback. In another embodiment, the media files that make up the channel content are loaded on request. For example, media files that are imported could be implemented as externally linked. In this case, only a portion of the channel content is loaded into cache memory before playback. Additional portions of channel content are loaded as requested by the multi-channel document management system (MDMS) of FIG. 7. In one embodiment, channel content is received as streaming content from over a network. Content data may be received as a channel content stream from a server or machine over the network, the content data then placed into cache memory as it is received. During content on-request mode, content in cache memory that has already been presented to a user is cycled out of cache memory to make room for future content. As content is presented, the system constantly requests future content data, processed current data, and replaces data associated with content already displayed that is still in cache memory, all in a cyclic manner. In one embodiment, the source of the requested data is a data stream received from over a network. The network may be a LAN, WAN, the Internet, or any other network capable of providing streaming data. The load on request method of providing channel content during playback uses less memory during document playback, but requires a faster processor to handle the streaming element. In one embodiment, the document will request an amount of future content that fills a predetermined amount of cache memory. In another amount, the document will request content up to a certain time period ahead of the currently provided content during document playback.

Once playback of the document has commenced in step 610, playback system 760 determines if playback of the document is complete at step 620. In one embodiment, playback of a document is complete if the content of all content channels has been played back entirely. In another embodiment, playback is complete when the content of one primary content channel has been played back to completion. In this embodiment, the primary content channel is a channel selected by the author. Other channels in a document may or may not play back to completion before the primary content channel content plays to completion. If playback has completed, then operation returns to step 610 where document playback begins again. If playback is not complete at step 620, then operation continues to step 630 where playback system 760 determines whether or not input has been received.

If no input is received within a particular time window at step 630, then operation returns to step 620. In one embodiment, more than one type of input could be received at step 630. As shown, input could be received as selection of a hot spot, channel selection, stop playback, or pause of playback. If input is received indicating a user has selected a hot spot as shown in step 640, operation continues to step 642. In one embodiment, the playback system 760 determines what type of input is received at step 642 and configures the document with the corresponding action as determined by playback system 760. The method 600 of FIG. 6 illustrates two recognized input types at step 644 and step 646. The embodiment illustrated in FIG. 6 is intended to be only an example of possible implementations, and more or fewer input types can be recognized accordingly. As shown in method 600, if a first input has been detected at a hot spot at step 644, then a first action corresponding to the first input is implemented in the multi-channel interface as shown at step 645. In one embodiment, a first input may include placing a cursor over a hot spot, clicking or double clicking a button on a mouse device when a cursor is placed over a hot spot, providing input through a keyboard or touch screen, or otherwise providing input to select a hot spot. The first action may correspond to a visual indicator indicating that a hot spot is present at the location selected by the user, text appearing in a supplemental channel or content channel, video playback in a supplemental channel or content channel, or some other action. In one embodiment, the visual indicator may include a highlighted border around the hot spot indicating that the user has selected a hot spot. A visual indicator may also include a change in the cursor icon or some other visual indicator.

In one embodiment, the action may continue after the input is received. An example of a continued action may include the playback of a video or audio file. Another example of a continuing action is a hot spot highlight that remains after the cursor is removed from the hot spot. In this embodiment, an input including placing a cursor over a hot spot may cause an action that includes providing a visible highlight around the hot spot. The visible highlight remains around the hot spot whether the cursor remains on the hot spot or not. Thus, the hot spot is locked as the highlight action continues. In another embodiment, the implemented action may last only as long as the input is received or a specified time afterwards. An example of this type of action may include highlighting a hot spot or changing a cursor icon while a cursor is placed over the hotspot. If a second input has been detected at a hot spot as shown at step 646, a second action corresponding to the second input is implemented by playback system 760 as shown in step 647. After an action corresponding to the particular input has been implemented, operation continues to step 620.

Input can also be received at step 630 indicating that a channel within the multi-channel interface has been selected as shown in step 650. In this case, operation continues from step 650 to step 652 where an action is performed. In one embodiment, the action may include displaying a visual indicator. The visual indicator may indicate that a user has provided input to select the particular channel selected. An example of a visual indicator may include a highlighted border around the channel. In another embodiment, the action at step 652 may include providing supplementary media content within a supplementary channel. Supplementary channels may be located inside or outside a content channel. After an action has been implemented at step 652, operation continues to step 620.

Though not pictured in method 600 of FIG. 6, input may also be received within a map channel as input selecting an object within the map channel. In this case, operation may continue in a manner similar to that described for hot spot selection.

Input can also be received at step 630 indicating a user wishes to end playback of the document as shown in step 660. If a user provides input indicating document playback should end, then playback ends at step 660 and operation of method 600 ends at step 662. A user may provide input that pauses playback of the document at step 670. In this case, a user may provide a second input to continue playback of the document at step 672. Upon receiving a second input at step 672, operation continues to step 620. Though not shown in method 600, a user may provide input to stop playback after providing input to pause playback at step 670. In this case, operation would continue from step 670 to end step 662. In another embodiment not shown in FIG. 6, input may also be received through user manipulation of a control bar within the interface. In this case, appropriate actions associated with those input will be executed accordingly. These actions may be predefined or implemented as a user plug-in option. For user plug-in, the MDMS may support a scripting engine or plug-in object compiled using a programming language.

Figure 7:
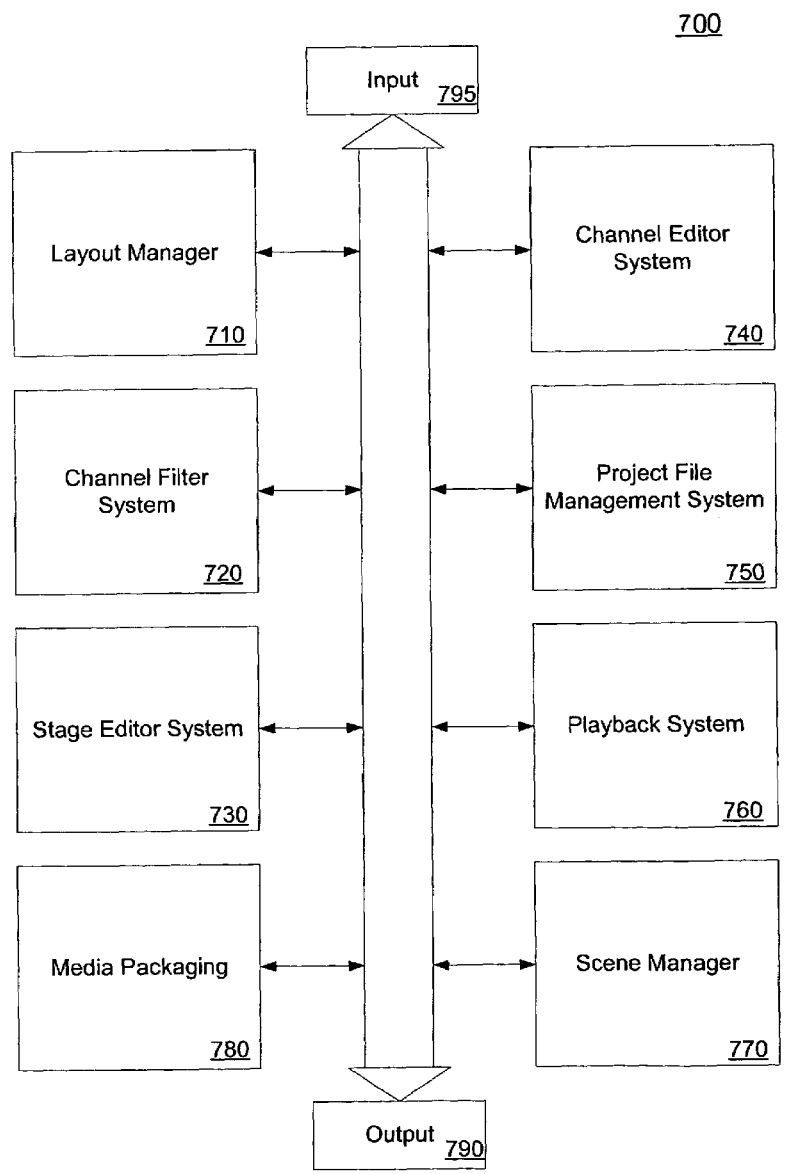
FIG. 7 illustrates a system for generating and executing an interactive multi-channel digital document in accordance with one embodiment of the present invention.

A multichannel document management system (MDMS) may be used for generating, playback, and editing an interactive multi-channel document. FIG. 7 is an illustration of an MDMS 700 in accordance with one embodiment of the present invention. MDMS 700 includes layout manager 710, channel filter system 720, stage editor system 730, channel editor system 740, project file manager 750, playback system 760, scene manager 770, media packaging 780, input 790, output 795. Components of system 700 can be implemented as hardware, software, or a combination of both. System modules 710-780 are discussed in more detail below. In one embodiment, the software component of the invention may be implemented in an object-based language such as JAVA, produced by Sun Microsystems of Mountain View, Calif., or a script-based language software such as "Director", produced by MacroMedia, Inc., of San Francisco, Calif. In one embodiment, the script-based software is operable to create an interface using a scripting language, the scripting language configurable to define an object and place a behavior to the object.

MDMS 700 may be implemented as a stand-alone application, client-server application, or internet application. When implemented in JAVA, the MDMS can operate on various operating systems including Microsoft Windows, UNIX, Linux, and Apple Macintosh. As a stand-alone application, the application and all content may reside on a single machine. In one embodiment, the media files presented in the document channels and referred to by a project file may be located at a location on the computer storing the project file or accessible over a network. In another embodiment, a stand-alone application may access media files from a URL location.

In a client-server application, the components comprising the MDMS may reside on the client, server, or both. The client may operate similarly to the stand-alone application. A user of the document or author creating a document may interact with the client end. In one embodiment, a server may includes a web server, video server or data server. In another embodiment, the server could be implemented as part of a larger or more complex system. The larger system may include a server, multiple servers, a single client or multiple clients. In any case, a server may provide content to the MDMS components on the client. When providing content, the server may provide content to one or more channels of a document. In one embodiment, the server application may be a collection of JAVA servlets. A transportation layer between the server and client can have any of numerous implementations, and is not considered germane to the present invention. As an internet application, the MDMS client component or components can be implemented as a browser-based client application and deployed as downloadable software. In one embodiment, the client application can be deployed as one or more JAVA applets. In another embodiment, the MDMS client maybe an application implemented to run within a web browser. In yet another embodiment, the MDMS client may be running as a client application on the supporting Operating System environment.

Figure 8:
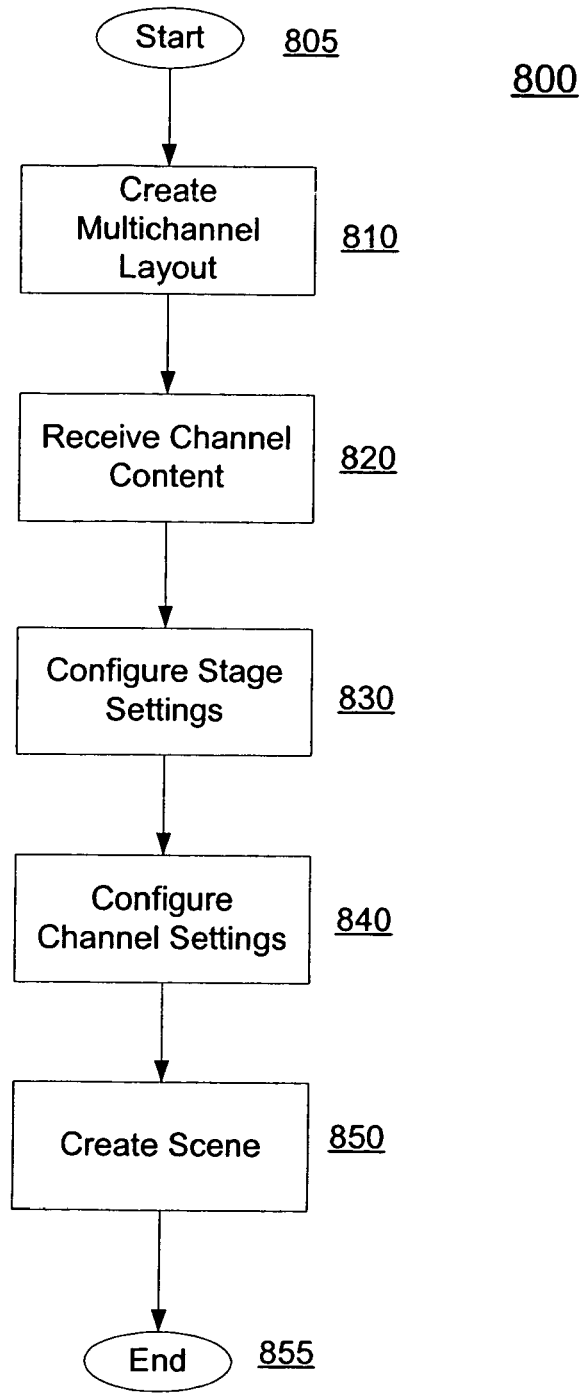
FIG. 8 illustrates a method for generating an interactive multichannel digital document in accordance with one embodiment of the present invention.

A method 800 for generating an interactive multi-channel document in accordance with one embodiment of the present invention is shown in FIG. 8. Method 800 can be used to generate a new document or edit an existing document. Whether generating a new document or editing an existing document, not all the steps of method 800 need to be performed. Further, when generating a new document or editing an existing document, steps 820–850 can be performed in any order. In one embodiment, document settings are stored in cache memory as the file is being created or edited. The settings being created or edited can be saved to a project file at any point during the operation of method 800. In one embodiment, method 800 is implemented using an interactive graphic user interface (GUI) that is supported by the system of the present invention.

In one embodiment, user input in method 800 may be provided through a series of drop down menus or some other method using an input device. In one embodiment, any stage and channel settings for which no input is received will have a default value in a project file. In one embodiment, as stage and channel settings are received, the stage settings in the project file are updated accordingly.

Figure 9:
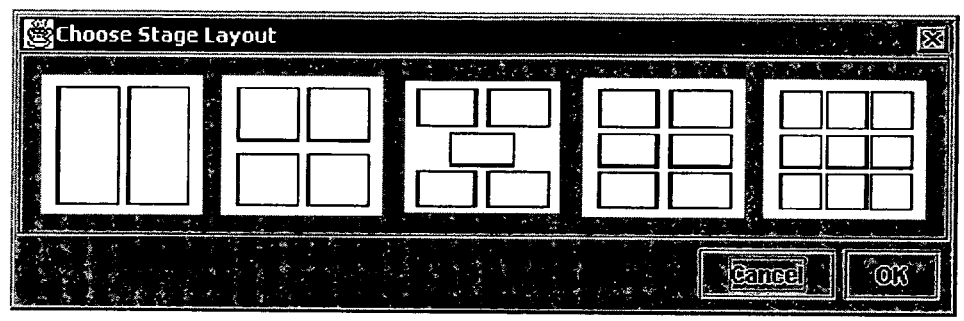
FIG. 9 illustrates multi-channel digital document layouts in accordance with one embodiment of the present invention.

Method 800 begins with start step 805. A multi-channel interface layout is created in step 810. In one embodiment, creating a layout includes allowing an author to create a channel size, the number of channels to place in the layout, and the location of each channel. In another embodiment, creating a layout includes receiving input from an author indicating which of a plurality of pre-configured layouts to use as the current layout. An example of pre-configured layouts for selection by an author is shown in FIG. 9. The creation of interface layouts is controlled by layout manager 710 in FIG. 7. In one embodiment, once an interface layout is created, a project file is created and configured with layout properties and default values for the remainder of the document settings. As channel properties, stage properties, mapping data and hot spot data are configured, the project file is updated with values for these settings. If no properties or data are configured, project file default values are used.

Next, channel content is received by the system in step 820. In one embodiment, channel content is received through input 795 and routed to channel filter system 720. Channel content may be received from a user or another system. A user may provide channel content input to the system using an input device. This may include providing file location information directly into a window or open dialogue box, dragging and dropping a file icon into a channel within the multi-channel interface, specifying a location over a network, such as a URL or other location, or some other means of providing content to the system. When received, the channel filter system 720 determines the channel content type to be one of several types of content. The determination of channel content may be done automatically or with user input. In one embodiment, the types of channel content include video, an image, a set of static images or slide show, web page content, audio or text. When receiving channel content automatically, the system may determine the content type automatically. Video format types capable of being detected may include but are not limited to AVI, MOV, MP2, MPG, and MPM. Audio format types capable of being detected may include but are not limited to AIF, AIFF, AU, FSM, MP3, and WAV. Image format types capable of being detected may include but are not limited to GIF, JPE, JPG, JFIF, BMP, TIF, and TIFF. Text format types capable of being detected may include but are not limited to TXT. Web page content may include html, java script, JSP or ASP. Additional types and formats of video, audio, text, images, slide, and web content types and formats may be used or added as they are developed as known by those skilled in the art. This may be performed by checking the type of channel content file against a list of known file types. When receiving the channel content with author input, the user may indicate the corresponding channel content type. If the channel filter system cannot determine the content type, the system may query the author to specify the content type. In this case, an author may indicate whether the content is video, text, slides, a static image, or audio.

In one embodiment, only one type of visual channel content may be received per channel. Thus, only one of video, an image, a set of images, or text type content may be loaded into a channel. However, audio may be added to any type of visual-based content, including such content configured as a map channel, as an additional content for that channel. In one embodiment, an author may configure at what time during the presentation of the visual-based content to present the additional audio content. In one embodiment, an author may select the time at which to present the audio content in a manner similar to providing narration for a content channel as discussed with respect to FIG. 10.

In one embodiment where the received information is the location of channel content, the location of the channel content is stored in cache memory. If a project file is saved, then the locations are saved to the project file as well. This allows system 700 to access the channel content upon request during playback and editing of a document. In another embodiment, when the content location is received, the content is retrieved, copied and stored in a memory location by media packaging module 780. This centralization of content files is advantageous when content files are located in different folders or networks and provides for easy transfer of a project file and corresponding content files. In yet another embodiment, the channel content may be preloaded into cache memory so that all channel content is available whether requested or not. In addition to configuring channel content as a type of content, a user may indicate that a particular channel content shall be designated as a map channel. Alternatively, a user may indicate that a channel is a map channel when configuring individual channels in step 840. In one embodiment, as channel content is received and characterized, the project file is updated with this information accordingly.

After receiving channel content, stage settings may be configured by a user in step 830. In one embodiment, stage settings are managed by stage editor 130. Stage settings may include features of the overall document such as stage background color, channel highlight color, channel background color, background sound, forward and credit text, user interface look and feel, timer properties, synchronized loop-back and automatic loop-back settings, the overall looping property of the document, the option of having an overall control bar, and volume settings. In one embodiment, stage settings are received by the system as user input. Stage background color is the color used as the background when channels do not take up the entire space of single page document. Channel highlight color is the color used to highlight a channel when the channel is selected by a user. Channel background color is the color used to fill in a channel with no channel content the background color when channel content is text. User interface look and feel settings are used to configure the document for use on different platforms, such as Microsoft Windows, Unix, Linux and Apple Macintosh platforms.

In one embodiment, a timer function may be used to initiate an action at a certain time during playback of the document. In one embodiment, the initiating event may occur automatically. The automatic initiating event may be any detectable event. For example, the event may be the completed playback of channel content in one or more content or supplementary channels or the expiration of a period of time. In another embodiment, the timer-initiating event may be initiated by user input. Examples of user-initiated events may include but are not limited to the selection of a hot spot, selection of a mapping object, selection of a channel, or the termination of document playback. In another embodiment, a register may be associated with a timer. For example, a user may be required to engage a certain number of hot spots within a period of time. If the user engages the required hot spots before the expiration of the timer, the timer may be stopped. If the user does not engage the hot spots before expiration of the timer, new channel content may be displayed in one or more content windows. In this case, the register may indicate whether or not the hot spots were all accessed. In one embodiment, the channel content may indicate the user failed to accomplish a task. Applications of a timer in the present invention include, but are not limited to, implementing a time limit for administering an examination or accomplishing a task, providing time delayed content, and implementing a time delayed action. Timer implementation is handled by playback system 760. Upon detecting the expiration of the timer, playback system 760 may initiate any document related action or event. This may include changing the primary content of a content channel, changing the primary content of all content channels, switching to a new scene, triggering an event that may be also be triggered by a hot spot, or some other type of event. Changing the primary content of a content channel may include replacing a first primary content with a second primary content, starting primary content in an empty content channel, stopping the presentation of primary content, providing audio content to a content channel, or other changes to content in a content channel.

Channel settings may be configured at step 840. In one embodiment, channel settings are managed by channel editor 740. As with stage settings, channel settings can be received as user input through an input device. Channel settings may include features for a particular channel such as color, font, and size of the channel text, forward text, credit text, narration text, and channel title text, mapping data for a particular channel, narration data, hot spot data, looping data, the color and pattern of the channel borders when highlighted and not highlighted, settings for visually highlighting a hot spot within the channel, the shape of hot spots within a channel, channel content preloading, map channels associated with the channel, image fitting settings, slide time interval settings, and text channel editing settings. In one embodiment, settings relating to visually highlighting hot spots may indicate whether or not an existing hot spot should be visually highlighted with a visual marker around the hot spot border within a channel. In one embodiment, settings relating to shapes of hot spots may indicate whether hot spots are to be implemented as circles or rectangles within a channel. Additionally, a user may indicate whether or not a particular channel shall be designated as a map channel. Channel settings may be configured one channel at a time or for multiple channels at a time, and for primary or supplementary channels. In one embodiment, as channel settings are received, the channel settings are updated in cache memory accordingly.

In one embodiment, an author may configure channel settings that relate to the type of content loaded into the channel. In one embodiment, a channel containing video content may be configured to have settings such as narration text turned on or off, maintain the original aspect ratio of the video. In an embodiment, a channel containing an image as content may be configured to have settings including fitting the image to the size of the channel and maintaining the aspect ratio of the image. In an embodiment, a channel containing audio as content may be configured to have settings including suppressing the level of a background audio channel when the channel audio content is presented. In an embodiment, a channel containing text as content may be configured to have settings including presenting the text in UNICODE format. In another embodiment, text throughout the document may be handled in UNICODE format to uniformly provide document text in a particular foreign language. When configured in UNICODE, text in the document may appear in languages as determined by the author.

A channel containing a series of images or slides as content may be configured to have settings relating to presenting the slides. In one embodiment, a channel setting may determine whether a series of images or slides is cycled through automatically or based on an event. If cycled through automatically, an author may specify a time interval at which a new image should be presented in the channel. If the images in a channel are to be cycled through upon the occurrence of an event, the author may configure the channel to cycle the images based upon the occurrence of a user initiated event or a programmed event. Examples of a user-initiated event include but are not limited to selection of a mapping object, hot spot, or channel by a user. An example of a programmed event may include but are not limited to the end of a content presentation within a different channel and the expiration of a timer.

Figure 10:
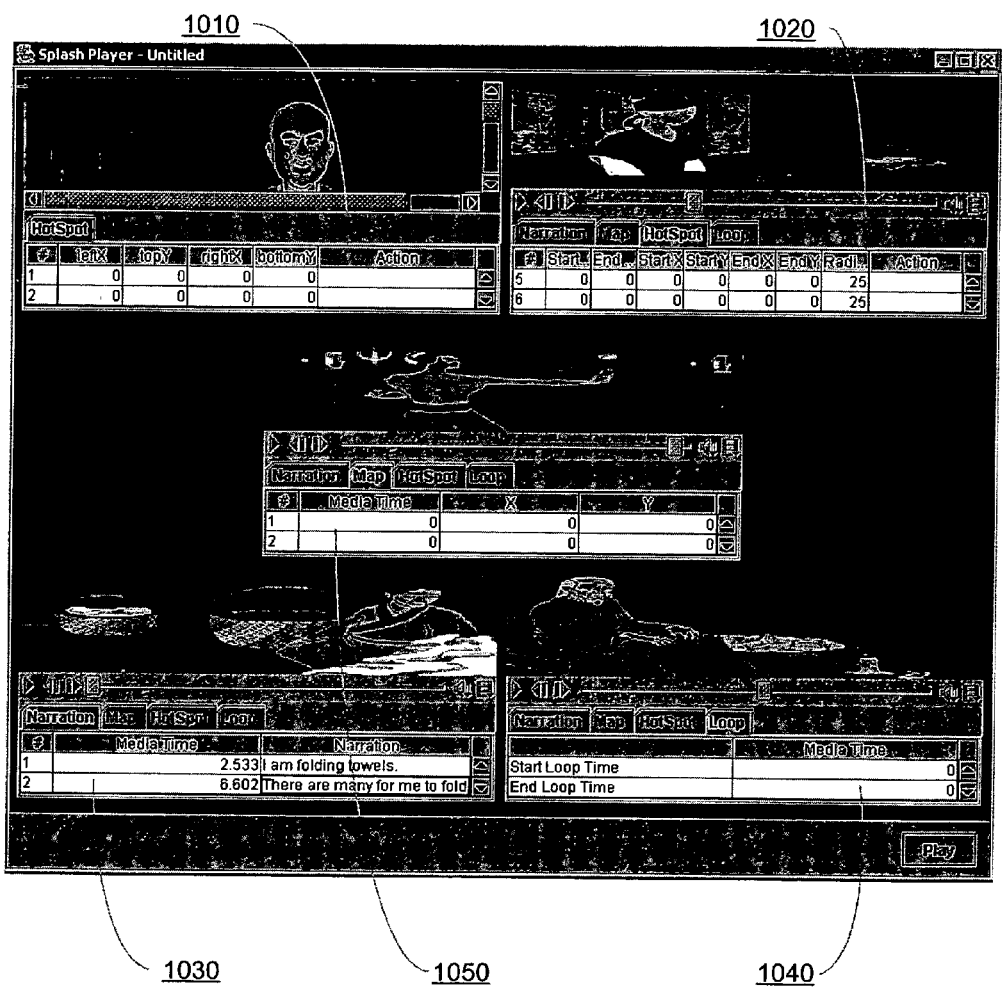
FIG. 10 illustrates an interface for generating a multi-channel digital document in accordance with one embodiment of the present invention.

FIG. 10 illustrates an interface 1000 for configuring channel settings in accordance with one embodiment of the present invention. For purposes of example, interface 1000 depicts five content channels consisting of two upper channels 1010 and 1020, two lower channels 1030 and 1040, and one middle channel 1050. When generating or editing a document, a user may provide input to initiate a channel configuration mode for any particular channel. In this embodiment, once channel configuration mode is selected, an editing tool allows a user to configure the channel. In the embodiment shown in FIG. 10, the editing tool is an interface that appears in the channel to be configured. Once in channel configuration mode, the user may select between configuring narration, map, hot spot, or looping data for the particular channel.

In FIG. 10, the lower left channel 1030 is configured to receive narration data for the video within the particular channel. In the embodiment shown, narration data may be entered by a user in table format. The table provides for entries of the time that the narration should appear and the narration content itself. In one embodiment, the time data may be entered directly by a user into the table. Alternatively, a user may provide input to select a narration entry line number, provide additional input to initiate playback of the video content in the channel, and then provide input to pause the video at some desired point. The desired point will correspond to a single frame or image. When paused, the media time at which the video was paused will automatically be entered into the table. In the lower left channel 1030 of interface 1000, entry number one is configured to display "I am folding towels" in a supplementary channel associated with content channel 1030 at a time 2.533 seconds into video playback. At a time associated with 6.602 seconds into playback of the document, the supplementary channel associated with content channel 1030 will display "There are many for me to fold". As discussed above, the location of the supplementary channel displaying text may be in the content channel or outside the content channel. In one embodiment, narration associated with a content channel can be configured to be displayed or not displayed through a corresponding channel setting.

In another embodiment, narration data may be configured to display narration content in a supplementary channel based upon the occurrence of an author-configured event. In this embodiment, the author may configure the narration to appear in a supplemental channel based upon document actions described herein, including but not limited to the triggering or expiration of a timer and user selection of a channel, mapping object, or hot spot (without relation to the time selected).

The lower right channel of interface 1000 is configured to have a looping characteristic. In one embodiment, looping allows an author to configure a channel to loop between a start time and an end time, only to proceed to a designated target time in the media content if user input is received. To configure a looping time, an author may enter the start loop time, end loop time, and a target or "jump to" time for the channel. In one embodiment, upon document playback, the playback system 760 will initiate playback of the looping portion of the channel content. When a user provides input selecting the channel, playback of the first portion "jumps" to the target point indicated by the author. Thus, a channel A may have channel content consisting of video lasting thirty seconds, a start loop setting of zero seconds and end loop setting of ten seconds, and target point of eleven seconds. Initially, playback system 760 will playback the channel content and loop back to the beginning of the content after the first ten seconds have been played. Upon receiving input from a user indicating that channel A has been selected, playback system 760 will initiate playback at the target time of eleven seconds in the content. At this point, playback will continue as the next looping setting is configured or until the end of content if no further loop-back characteristic is configured. The configuration of map channels, mapping data and hot spot data is discussed in more detail below with respect to FIGS. 11 and 12.

In one embodiment of the present invention, configuring channel settings may include configuring a channel within the multi-channel interface to serve as a map channel. A map channel is a channel in which mapping objects are displayed. In one embodiment, the channel in which mapping data is associated with differs from the map channel itself. In this embodiment, any channel may be configured with mapping data as long as it is associated with a map channel. The mapping data is used to configure a mapped object on the map channel. A mapped object appears in the map channel according to the data associated with another channel. The mapping data configured for a channel may represent movement in a map, ascending or descending values in a graph, or any other dynamic or static element.

Figure 11:
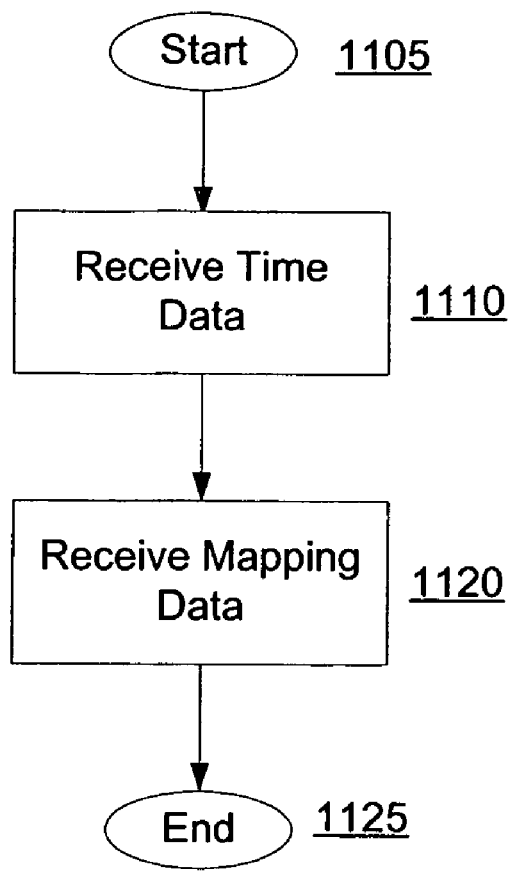
FIG. 11 illustrates a method for generating a mapping feature in a multichannel digital document in accordance with one embodiment of the present invention.

Configuring mapping data for a channel in accordance with one embodiment of the present invention is illustrated in method 1100 of FIG. 11. Method 1100 begins with start step 1105. Next, time data is received in step 1110. The time data corresponds to the time during channel content playback at which the mapping object should be displayed in the map channel. For example, an interface 1000 for configuring channels for a multi-channel interface, in accordance with one embodiment of the present invention, is shown in FIG. 10. In the embodiment shown, the center channel 1050 is set to be configured with mapping data. As shown, the user may input the time that the mapping object will be displayed in the designated map channel under the "Media Time" column. The time entered is the time during playback of the channel content at which an object or mapping point is to be displayed in the map channel. Though the mapping time and other mapping data for the center channel are entered into an interface within the center channel, the actual mapping will be implemented in a map channel as designated by the author. Thus, any of the five channels shown in FIG. 10 could be selected as the map channel. In this embodiment, the mapping data entered into the center channel will automatically be applied to the selected map channel. In one embodiment, the mapping time may be chosen by directly entering a time into the interface directly. In another embodiment, the mapping time may be entered by first enabling the mapping configuration interface shown channel 1050 of FIG. 10, providing an input to select a data entry line in the interface, providing input to initiate playback of the channel content of the channel, and then providing input to pause channel content playback, thereby selecting the time in content playback at which the mapping object should appear in the map channel. In this embodiment, the time associated with the selected point in channel content playback is automatically entered to the mapping interface of the channel for which mapping data is being entered.

After time data is received in step 1110, mapping location data is received by the system in step 1120. In one embodiment, the mapping location data is a two dimensional location corresponding to a point within the designated map channel. In the embodiment shown in FIG. 10, the two dimensional mapping location data is entered in the interface of the center channel 1050 as an x,y coordinate. In one embodiment, an author may provide input directly into the interface to select an x,y coordinate. In another embodiment, an author may select a location within the designated map channel using an input device such as a touch-screen monitor, mouse device, or other input device. Upon selecting a location within the designated map channel, the coordinates of the selected location in the map channel will appear automatically in the interface within the channel for which mapping location data is being configured. Upon playback of a document with a map channel and mapping data, a point or other object will be plotted on the map channel at the time and coordinates indicated by the mapping data. Several sets of mapping points and times can be entered for a channel. In this case, when successive points are plotted on a map channel, previous points are removed. In this embodiment, the appearance of a moving point can be achieved with a series of mapping data having a small change in location and a small change in time. In another embodiment, mapping objects can be configured to disappear from a map channel. Removing a mapping object may be implemented by receiving input indicating a start time and end time for displaying a mapping object in a map channel. Once all mapping data has been entered for a channel, method 1100 ends at step 1125. In one embodiment, an author may configure a start time and end time for the mapped point or object to control the time an object is displayed on a map channel.

In another embodiment, an author may configure mapping data such that a mapping object is displayed in a map channel based upon the occurrence of an event during document playback. In this embodiment, the author may configure the mapping object to appear in a map channel based upon document actions described herein, including but not limited to the triggering or expiration of a timer and user selection of a channel or hot spot (without relation to the time selected).

Figure 12:
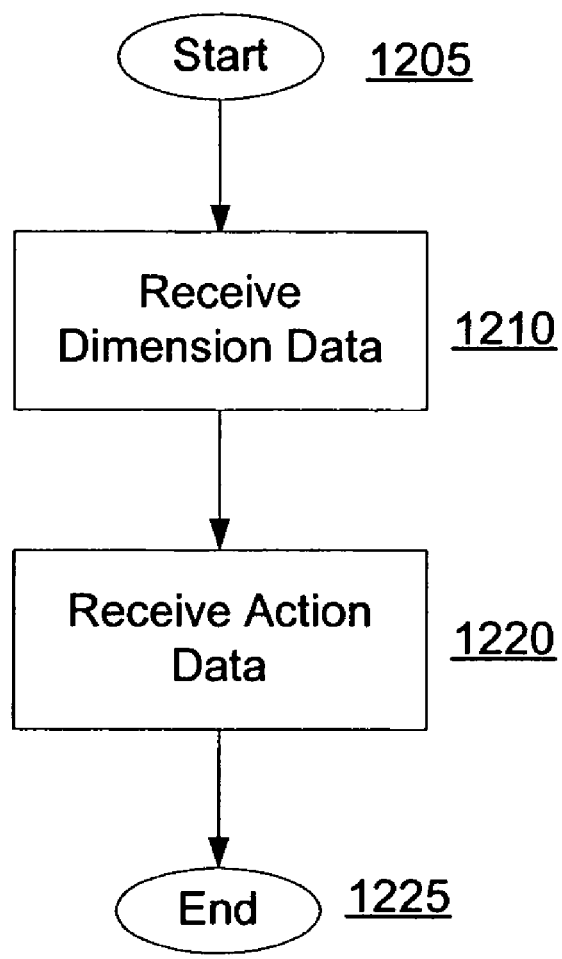
FIG. 12 illustrates a method for generating a stationary hot spot feature in a multichannel digital document in accordance with one embodiment of the present invention.

In another embodiment, configuring a channel may include configuring a hot spot within a channel. A two dimensional hot spot may be configured for any channel having visual based content including a set of images, an image, text or video, including such channels configured as a map channel, in a multi-channel interface in accordance with the present invention. In one embodiment, a hot spot may occupy an enclosed area within a content channel, whereby the user selection of the hot spot initiates an action to be performed by the system. The action initiated by the selection of the hot spot may include starting or stopping media existing in another channel, providing new media to or removing media from a channel, moving media from one channel to another, terminating document playback, switching between scenes, triggering a timer to begin or end, providing URL content, or any other document event. In another embodiment, the event can be scripted in a customized manner by an author. The selection of the hot spot may include receiving input from an input device, the input associated with a two-dimensional coordinate within the area enclosed by the hot spot. The hot spot can be stationary or moving during document playback. A method 1200 for configuring a stationary hot spot in accordance with one embodiment of the present invention is shown in FIG. 12. In one embodiment, while editing channel properties, an author may configure a channel interface with a stationary hot spot data as shown in channel 1010 of FIG. 10. In the embodiment shown, timing data is not entered into the interface and the hot spot exists throughout the presentation of the content associated with the channel. The hot spot is configured by default to exist for the entire length of time that the content appears in the particular channel. In anther embodiment, a stationary hot spot can be configured to be time-based. In this embodiment, the stationary hot spot will only exist in a channel for a period of time as configured by the author. Configuring a time-based stationary hot spot may be performed in a manner similar to configuring time-based properties for a moving hot spot as discussed with respect to method 1300. Stationary hot spots may be configured for visual media capable of being implemented over a period of time, including but not limited to time-based media such as an image, a set of images, and video.

Method 1200 begins with start step 1205. Next, hot spot dimension data is received in step 1210. In one embodiment, dimension data includes a first and second two dimensional point, the points comprising two opposite corners of a rectangle. The points may be input directly into an interface such as that shown in channel 1010 of FIG. 10. In another embodiment, the points may be entered automatically after an author provides input selecting the first and second point in the channel. In this case, the author provides input to select an entry line number, then provides input to select a first point within the channel, and then provides input to select the second point in the channel. As the two points are selected in the channel, the two dimensional coordinates are automatically entered into the interface. For example, a user may provide input to place a cursor at the desired point within a channel. The user may then provide input indicating the coordinates of the desired point should be the first point of the hot spot. When the input is received, channel editor system 740 automatically retrieves the coordinates of the selected location and stores them as the initial point for the hot spot. In one embodiment, the channel editor system 740 displays the selected coordinates in an interface as shown in channel 1010 of FIG. 10. Next, the user may provide input to place the cursor at the second point of the hot spot and input that configures the coordinates of the point as the second point. In one embodiment, the channel editor system 740 displays the selected coordinates in an interface as they are selected by a user as shown in channel 1010 of FIG. 10.

In another embodiment, a stationary hot spot may take the shape of a circle. In this embodiment, dimension data may include a first point and a radius to which the hot spot should be extended from the first point. A user can enter the dimensional data for a circular hot spot directly into an interface table or by selecting a point and radius in the channel in a manner similar to selecting a rectangular hot spot.

After dimensional data is received in step 1210, action data is received in step 1220. Action data specifies an action to execute once a user provides input to select the hot spot during playback of the document. The action data may be one of a set of pre-configured actions or an author configured action. In one embodiment, a pre-configured action may include a highlight or other visual representation indicating that an area is a hot spot, a change in the appearance of a cursor, playback of video or other media content in a channel, displaying a visual marker or other indicator within a channel of the document, displaying text in a portion of the channel, displaying text in a supplementary channel, selection of a different scene, stopping or starting a timer, a combination of these, or some other action. The inputs that may trigger an action may include placing a cursor over a hot spot, a single click or double click of a mouse device while a cursor is over a hot spot, an input from a keyboard or other input device while a cursor is over a hot spot, or some other input. Once an action has been configured, method 1200 ends at step 1225.

Figure 13:
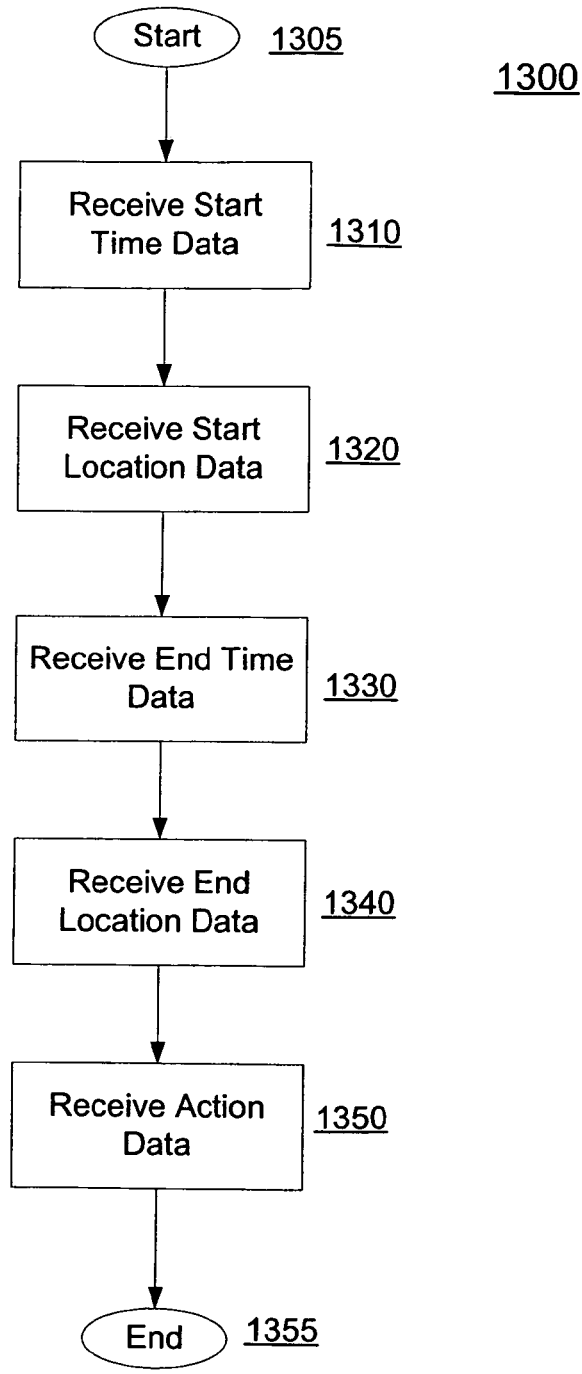
FIG. 13 illustrates a method for generating a moving hot spot feature in a multichannel digital document in accordance with one embodiment of the present invention.

A method 1300 for configuring a moving hot spot in accordance with one embodiment of the present invention is illustrated in FIG. 13. Configuring a moving hot spot in accordance with the present invention involves determining a hot spot area, a beginning hot spot location and time and an ending hot spot location and time. Playback system 760 then configures the hot spot to move from the start location to the ending location over the time period indicated during document playback. Method 1300 begins with start step 1305. Next, beginning time data is received by the system in step 1310. In one embodiment, an author can enter beginning time data directly into an interface or by selecting a time during playback of channel content. The starting location data for the hot spot is then received by the system at step 1320. In one embodiment, starting location data includes two points that form opposite corners of a rectangle. The points can be entered directly into a hot spot configuration interface or by selecting the points within the channel that will contain the hot spot, similar to the first and second point selection of step 1210 of method 1200. In another embodiment, the hot spot is in the shape of a circle. In this case, the starting location data includes a center point and radius data. In a manner similar to that of method 1200, an author may directly enter the center point and radius data into an interface for configuring a moving circular hot spot such as the interface illustrated in channel 1020 in FIG. 10. Alternatively, an author may select the center point and radius in the channel itself and the corresponding data will automatically be entered into such an interface. Next, the end time data is received at step 1330. As with the start time, the stop time can be entered by providing input directly into a hot spot interface associated with the channel or by selecting a point during playback of the channel content. The ending point data is then received at step 1340 in a similar manner as the starting point data. Action data is then received in step 1350. Action data specifies an action to execute once a user provides input to select the hot spot during playback of the document. The action data may be one of a set of pre-configured actions or an author configured action, as discussed in relation to method 1200. Receiving a hot spot in step 1350 is similar to receiving a hot spot in step 1220 of method 1200 and will not be repeated herein. Operation of method 1300 ends at step 1355. Multiple moving hot spots can be configured for a channel by repeating method 1300.

In yet another embodiment, an author may dynamically create a hot spot by providing input during playback of a media content. In this embodiment, an author provides input to select a hot spot configuration mode. Next, the author provides input to initiate playback of the media content and provides a further input to pause playback at a desired content playback point. At the desired playback point, an author may provide input to select a initial point in the channel. Alternatively, the author need not provide input to pause channel content playback and need only provide input to select an initial point during content playback for a channel. Once an initial point is selected, content playback continues from the desired playback point forward while an author provides input to formulate a path beginning from the initial point and continuing within the channel. As the author provides input to formulate a path within the channel during playback, location information associated with the path is stored at determined intervals. In one embodiment, an author provides input to generate the path by manipulating a cursor within the channel. As the author moves the cursor within the channel, the system samples the channel coordinates associated with the location of the cursor and enters the coordinates into a table along with their associated time during playback. In this manner, a table is created containing a series of sampled coordinates and the time during playback each coordinate was sampled. Coordinates are sampled until the author provides an input ending the hot spot configuration. In one embodiment, hot spot sampling continues while an author provides input to move a cursor through a channel while pressing a button on a mouse device. In this case, sampling ends when the user stops depressing a button on the mouse device. In another embodiment, the sampled coordinate data stored in the database may not correspond to equal intervals. For example, the system may configure the intervals at which to sample the coordinate data as a function of the distance between the coordinate data. Thus, if the system detected that an author did not provide input to select new coordinate data over a period of three intervals, the system may eliminate the data table entries with coordinate data that are identical or within a certain threshold.

Though hot spots in the general shape of circles and rectangles are discussed herein, the present invention is not intended to be limited to hot spots of any these shapes. Hot spot regions can be configured to encompass a variety of shapes and forms, all of which are considered within the scope of the present invention. Hot spot regions in the shapes of a circle and rectangle are discussed herein merely for the purpose of example.

During playback, a user may provide input to select interactive regions corresponding to features including but not limited to a hot spot, a channel, mapping object, and object representations in mapping channels. When a selecting input is received, the MDMS determines if the selecting input corresponds to a location in the document associated with a location configured to be an interactive region. In one embodiment, the MDMS compares the received selected location to regions configured to be interactive regions at the time associated with the user selection. If a match is found, then further processing occurs to implement an action associated with the interactive region as discussed above.

A scene may be configured in step 850. In one embodiment, scene manager 770 controls scene configuration and management. A scene is a collection or layer of channel content for a document. In one embodiment, a document may have multiple scenes but retains a single multi-channel layout or grid layout. A scene may contain content to be presented simultaneously for up to all the channels of a digital document. When document playback goes from a first scene to a second scene, the media content associated with the first scene is replaced with media content associated with the second scene. For example, for a document having five channels as shown in FIG. 10, a first scene may have media content in all five channels and a second scene may have content in only the top two channels. When traversing from this first scene to the second scene, the document will change from displaying content in all five channels to displaying content in only the top two channels. Thus, when traversing from scene to scene, all channel content of the previous scene is replaced to present the channel content (or lack thereof) associated with the current scene. In another embodiment, only some channels may undergo a change in content when traversing between scenes. In this case, a four channel document may have a first scene with media content in all four channels and a second scene may be configured with content in only two channels. In this case, when the second scene is activated, the primary content associated with the second scene is displayed in the two channels with configured content. The two channels with no content in the second scene can be configured to have the same content as a different scene, such as scene one, or present no content. When configured to have the same content as the first scene, the channels effectively do not undergo any change in content when traveling between scenes. Though examples discussed herein have used two scenes, any number of scenes is acceptable and the examples and embodiment discussed herein are not intended to limit the scope of the present invention.

The scene manager allows a user to create and edit a scene by allowing a user to import media and save the scene with a unique identifier. Scene progression in a document may then be choreographed based upon user input or automatic events within the document. Traveling through scenes automatically may be done as the result of a timer as discussed above, wherein the action taken at the expiration of the timer corresponds to initiating the playback of a different scene, or upon the occurrence of some other automatically occurring event. Traveling between scenes as the result of user input may include input received from selection of a hot spot, selection of a channel, or some other input. In one embodiment, upon creating a multi-channel document, the channel content is automatically configured to be the initial scene. A user may configure additional scenes by configuring channel content, stage settings, and channel settings as discussed above in steps 820–840 of method 800. After scenes have been configured, operation ends at step 855.

In one embodiment, a useful feature of a customized multi-channel document of the present invention is that the media elements are presented exactly as they were generated. No separate software applications are required to play audio or view video content. The timing, spatial properties, synchronization, and content of the document channels is preserved and presented to a user as a single document as the author intended.

In one embodiment of the present invention, a digital document may be annotated with additional content. The additional content may include text, video, images, sound, mapping data and mapping objects, and hot spot data and hot spots. In one embodiment, the annotations may be added as additional material by editing an existing digital document project file as illustrated in and discussed with regard to FIGS. 8 and 10–13. Annotations are added in addition to the pre-existing content of a document, and do not change the pre-existing document content. Depending on the application of the document, annotations may be added to channels having no content, channels having content, or both.

In one embodiment, annotations may be added to document channels having no content. Annotation content that can be added in this embodiment includes text, video, one or more images, web page content, mapping data to map an object on a designated map channel and hot spot data for creating a hot spot. Content may be added as discussed above and illustrated in FIGS. 8 and 10–13.

Annotations may be used for several applications of a digital document in accordance with the present invention. In one embodiment, the annotations may be used to implement a business report. For example, a first author may create a digital document regarding a monthly report. The first author may designate a map channel as one of several content channels. The map channel may include an image of a chart or other representation of goals or tasks to accomplish for a month, quarter, or some other interval. The document could then be sent to a number of people considered annotating authors. Each annotating author could annotate the first author's document by generating a mapping object in the map channel showing progress or some other information as well as providing content for a particular channel. If a user selects an annotating author's mapping object, content may be provided in a content channel. In one embodiment, each content channel may be associated with one annotating author. The mapping object can be configured to trigger content presentation or the mapping object can be configured as a hot spot. Further, the annotating author may configure a content channel to have hot spots that provide additional information.

In another embodiment, annotations can be used to allow multiple people to provide synchronized content regarding a core content. In this embodiment, a first author may configure a document with content such as a video of an event. Upon receiving the document from the first author, annotating authors could annotate the document by providing text comments at different times throughout playback of the video. Each annotating author may configure one channel with their respective content. In one embodiment, comments can be entered during playback by configuring a channel as a text channel and setting a preference to enable editing of the text channel content during document playback. In this embodiment, a user may edit the text within an enabled channel during document playback. When the user stops document playback, the user's text annotations are saved with the document. Thus, annotating authors could provide synchronized comments, feedback, and further content regarding a teleconference, meeting, video or other media content. Upon playback of the document, each annotating author's comments would appear in a content channel at a time during playback of the core content as configured by the annotating author.

A project file may be saved at any time during operation of method 800, 1100, 1200 and 1300. A project file may be saved as a text file, binary file, or some other format. In any case, the author may configure the project file in several ways. In one embodiment, the author may configure the file to be saved in an over-writeable format such that the author or anyone else can open the file and edit the document settings in the file. In another embodiment, the author may configure a saved project file as annotation-allowable. In this case, secondary authors other than the document author may add content of the project file as an annotation but may not delete or edit the original content of the document. In yet another embodiment, a document author may save a file as protected wherein no secondary author may change original content or add new content.

In another embodiment, an MDMS project file can be saved for use in a client-server system. In this case, the MDMS project file may be saved by uploading the MDMS project file to a server. To access the uploaded project file, a user or author may access the uploaded MDMS project file through a client.

In one embodiment, a project file of the MDMS application can be accessed by loading the MDMS application jar file and then loading the .spj file. A .jar file in this case includes document components and java code that creates a document project file—the .spj file. In one embodiment, any user may have access to, playback, or edit the .spj file of this embodiment. In another embodiment, a .jar file includes the document components and java code included in the accessible-type .jar file, but also includes the media content comprising the document and resources required to playback the document. Upon selection of this type of .jar file, the document is automatically played. The .jar file of this embodiment may be desirable to an author who wishes to publish a document without allowing users to change or edit the document. A user may playback a publish-type .jar file, but may not load it or edit it with the document authoring tool of the present invention. In another embodiment, only references to locations of media content are stored in the publish-type .jar file and the not the media itself. In this embodiment, execution of the .jar file requires the media content to be accessible in order to playback the document.

Figure 14:
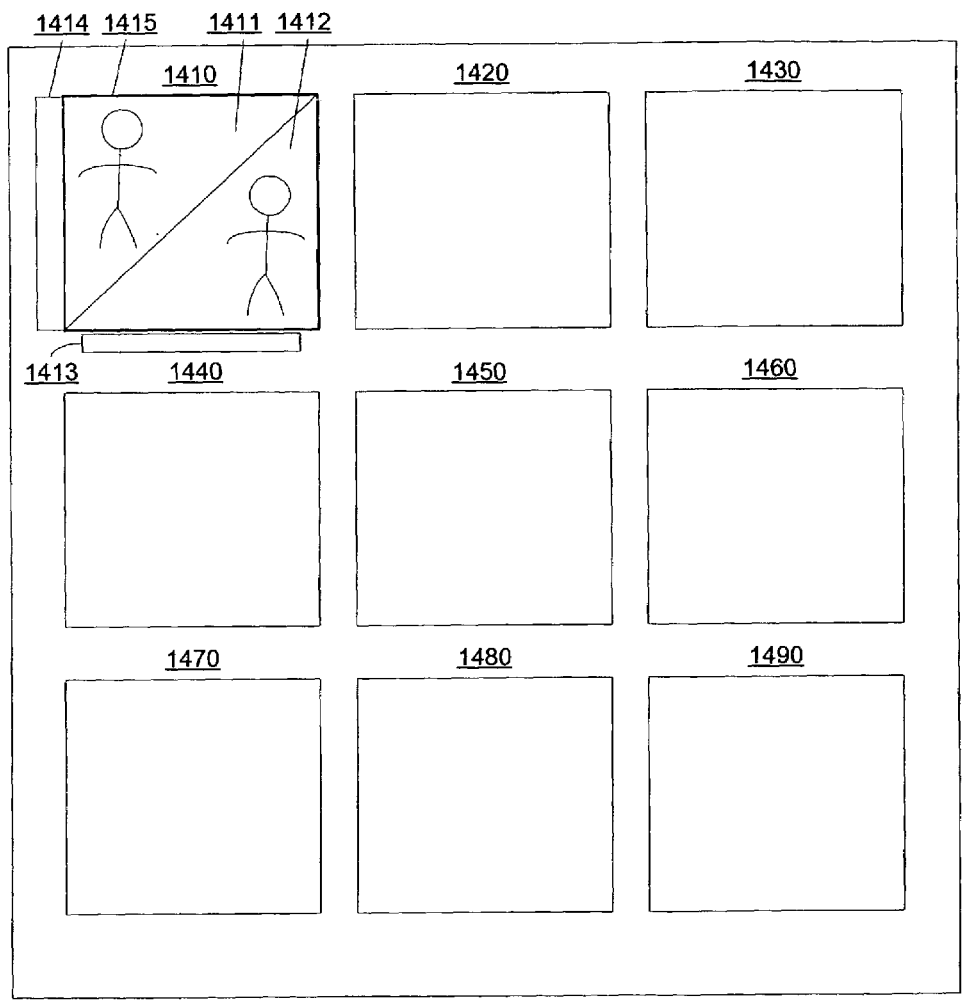
FIG. 14 is a diagram of a multi-frame interactive narration system interface in accordance with one embodiment of the present invention.

In yet another embodiment of the present invention, the multi-channel interface may be used to communicate a story using content that is related but not required to be synchronized. For example, an author may wish to recount a narrative regarding a conference the author attended. The author may construct a narration consisting of videos relating to the different speakers and topics discussed at the conference. These videos are related, but do not necessarily need to be presented simultaneously. One system for presenting content of this nature is shown as the narrative interface 1400 of FIG. 14. Narrative interface 1400 includes multiple content channels 1410, 1420, 1430, 1440, 1450, 1460, 1470, 1480, and 1490 and supplemental channels such as channel 1413. Each content channel may represent one or more videos. In the case of multiple videos for one channel, the videos may be related to each other. Each video may be represented by an image or a summary video segment. A summary video segment would contain only a small representation of the content of the original video to provide an overview of the original video's content. A channel that represented more than one video may repetitively and alternately present the images or summary videos in a continuous loop. In this manner, numerous videos or other content could be represented on a single page. Instead of organizing content with multiple windows that overlap each other, the content itself and repetition are used to organize the content. In one embodiment, a selected video that appears in a channel would play out in the same channel.

In one embodiment, the author may configure aspects related to the repetition and content such as the number of frames on a screen, the number of video images or summaries per channel, and the length of time between consecutive images or summaries. In this manner, each frame may be configured to have a constant, repetitious looping characteristic, thereby forming a rhythmic appearance to help keep track of the information presented by the interface.

In one embodiment of the present invention, to further encourage interactivity, all the channels are made the same size. Further, the most important content is not placed in the center of the multiple channels. In an embodiment, the most interesting or important content may be placed in the content channels at the edges of the interface. Distributing important or interesting content throughout the interface encourages movement by the user through the channels of the interface. When a particular video is selected by a user, text may be shown in a supplemental channel that relates to the selected video. For example, content channel 1410 of FIG. 14 may include videos 1411 and 1412. The videos may be represented as short summary videos that repetitively loop after each other within channel 1410. Upon selecting either video 1411 or 1412, text may appear in supplemental channel 1413 that relates to the video. Further, while the summary video is playing, text may appear in supplemental window 1414.

Figure 15:
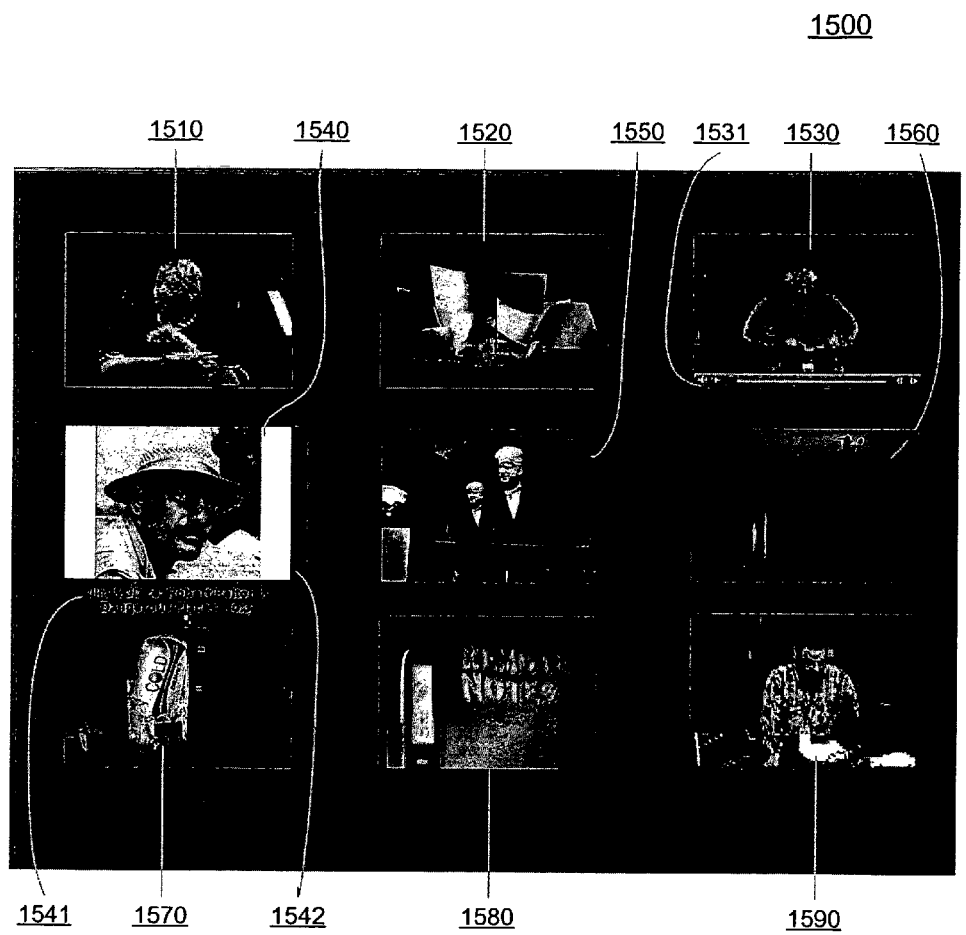
FIG. 15 illustrates a diagram of a multi-frame interactive narration system interface as displayed on a video monitor in accordance with one embodiment of the present invention.

A diagram of a multi-frame interactive narration system interface 1500 having multiple non-simultaneous videos as displayed on a display screen in accordance with one embodiment of the present invention is shown in FIG. 15. Interface 1500 includes content channels 1510, 1520, 1530, 1540, 1550, 1560, 1570, 1580, and 1590, supplemental channel 1541, text box 1542, and bar menu 1531. In the embodiment shown, FIG. 15 represents multiple related videos in nine content channels. If a video is selected, a menu bar may be used to indicate the location of the current frame in the video segment such as menu bar 731. Content channel 1540 is selected as shown in FIG. 15. Accordingly, a supplementary channel 1541 may display text as relating to selected content channel 1540. Additionally, text may be provided to promote interactivity of the user with the selected content channel, as shown by text box 1542.

The current invention provides an interactive narration interface for achieving a higher level of interaction from a user. The interface of the present invention features a single interface and content that includes video, text, images and sound. The content is managed using the content itself and time. In one embodiment, the interactive narration interface includes a multi-channel interface that can display synchronized content along a multi-dimensional grid, each in a continuous loop. Text and sound are activated through the user's interaction with the channels. The content in the multi-channel interface may repeat in a looping pattern to allow a user to experience the different content associated with each channel. In another embodiment, an interactive digital document of the present invention may be generated by an author and annotated by secondary authors. The document may allow a user to explore content without following multiple layers of information, either through hyperlinks or other methods.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A digital document comprising:
   a plurality of content channels, each of the plurality of content channels configured to provide primary content and be selectable by a user during playback of the document, the primary content provided continuously in a looping manner until termination of document playback is initiated by a user input;
   at least one supplementary channel configured to provide supplementary content upon the selection of a content channel by a user during playback of the document, the plurality of content channels and at least one supplementary channel provided on a single page; and
   wherein the supplementary content is associated with the primary content contained in one of the plurality of content channels and at a specified time during presentation of the primary content within the content channel, the supplementary content being displayable in the supplementary channel only when the content channel containing the primary content is selected at the specified time associated with the supplementary content.

2. The digital document of claim 1 wherein the digital document resides entirely on a single machine.

3. The digital document of claim 1 wherein the digital document resides on a client machine.

4. The digital document of claim 1 wherein the digital document resides on a server.

5. The digital document of claim 1 wherein the digital document primary and supplementary content are receivable over a network from a server.

6. The digital document of claim 1 wherein the digital document primary and supplementary content are receivable from a URL location.

7. The digital document of claim 1 wherein the primary content includes one of video, an image, a set of images, web page content and text.

8. The digital document of claim 1 wherein the primary content includes audio content.

9. The digital document of claim 7 wherein the primary content also includes audio content.

10. The digital document of claim 1 wherein the supplementary content includes one of video, an image, a set of images, web page content and text.

11. The digital document of claim 10 wherein the supplementary content also includes audio content.

12. The digital document of claim 1 wherein the supplementary content includes audio content.

13. The digital document of claim 1 wherein a selected one of the plurality of content channels includes a visual representation, the visual representation shown to the user while the content channel is selected.

14. The digital document of claim 13 wherein the visual representation includes a highlighted channel border of the selected channel.

15. The digital document of claim 1 further comprising:
    a background audio channel configured to provide background audio during playback of the document, the background audio presented independent of content channel selection by a user.

16. The digital document of claim 1 further comprising:
    a hot spot, the hot spot comprising a two-dimensional region within one of said plurality of content channels, the hot spot configured to be selected by a user, an action being initiated upon selection of the hot spot by the user.

17. The digital document of claim 16 wherein the action includes implementing a change to the visual representation of a cursor while the cursor is within the hot spot.

18. The digital document of claim 16 wherein the two-dimensional region is the content channel the hot spot is located in.

19. The digital document of claim 16 wherein the two-dimensional region includes at least one visual highlight.

20. The digital document of claim 19 wherein the at least one visual highlight includes:
    a first visual highlight comprised of a border around the two-dimensional region; and
    a second visual highlight comprised of a highlighted cursor icon, wherein a cursor is represented by a first cursor icon when the cursor is not placed over the two-dimensional region, the cursor represented by the highlighted cursor icon when the cursor is placed over the two-dimensional region.

21. The digital document of claim 19 wherein the visual highlight is initiated by selection of a hot spot by a user.

22. The digital document of claim 1 wherein one of the plurality of content channels includes video content, the content channel configured to repetitively present a first portion of the video content and present a second portion of the video content upon receiving input from a user during the repetitive presentation of the first portion.

23. The digital document of claim 1 further comprising:
a timer configured to count-down a period of time, the timer configured to begin countdown upon the occurrence of a first event, the timer configured to initiate a second event upon completion of the count down.

24. The digital document of claim 23 wherein the first event is user initiated.

25. The digital document of claim 23 wherein the first event occurs automatically.

26. The digital document of claim 23 wherein the second event includes:
configuring a change to the primary content of at least one of the plurality of content channels.

27. The digital document of claim 1 wherein the digital document includes a spatial depth formed by said plurality of content channels and said at least one supplementary channel.

28. The digital document of claim 1 wherein the digital document includes a temporal boundary formed by the repetitive presentation of the primary content within the primary content channels.

29. A method for playback of a multi-channel digital document comprising:
(a) playback of primary content within a plurality of primary channels within the multi-channel document, including repeating playback of the primary content once the entire content has been played;
(b) at some point during playback of primary content, receiving interactive input from a user, the input indicating a portion of the primary content has been selected;
(c) performing an action in response to the user input received;
(d) repeating steps (a) through (c) until input terminating document playback is received from the user; and
(e) wherein the input is the selection of a hot spot region within a channel, and the resulting action includes providing resulting primary content in one of the plurality of primary channels wherein the supplementary content is associated with the primary content contained in one of the plurality of content channels and at a specified time during presentation of the primary content within the content channel, the supplementary content being displayable in the supplementary channel only when the content channel containing the primary content is selected at the specified time associated with the supplementary content.

30. The method of claim 29 wherein the resulting action includes providing a visual indicator to indicate the selection of the selected channel.

31. A digital document comprising:
a plurality of content channels, each of the plurality of content channels configured to provide primary content and be selected by a user during playback of the document, the primary content provided continuously in a looping manner until termination of document playback is initiated by user input;
at least one supplementary channel configured to provide supplementary content upon the selection of a content channel by a user during playback of the document, the plurality of content channels and at least one supplementary channel provided on a single page; and
a moving hot spot, the moving hot spot associated with hot spot data that includes hot spot area data defining a hot spot region within one of the plurality of content channels, time data, and a corresponding action, the corresponding action triggered during document playback upon user selection of the hot spot region, the corresponding action changing the primary content provided in one of the plurality of content channels.

32. The digital document of claim 1 wherein the plurality of content channels and at least one supplementary content are configured to implement an educational document.

33. The digital document of claim 1 wherein the plurality of content channels and at least one supplementary content are configured to implement an advertising document.

34. The method of claim 29, further comprising before step (a):
receiving a project file;
parsing the project file; and
configuring a document to be played.

35. The method of 34 wherein parsing the project file includes:
parsing channel content, document properties, and stage preferences.

36. The method of claim 29, further comprising:
loading all of the primary content into cache memory before playback of the document begins.

37. The method of claim 29, further comprising:
loading a portion of the primary content into cache memory before playback of the document begins; and
loading additional portions of the primary content into cache memory during playback, the loading of the primary content performed to allow the primary content to be played in a continuous manner.

38. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot having a two-dimensional region within one of said plurality of content channels, the hot spot being configured to be selectable by a user and an action being initiated upon selection of the hot spot by the user, wherein the content of the one channel is time-based content during playback of the one channel, and wherein said hot spot is configured to change location within the one channel.

39. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot having a two-dimensional region within one of said plurality of content channels, the hot spot being configured to be selectable by a user and an action being initiated upon selection of the hot spot by the user, wherein the action indicates implementing a change to the primary content in one of the content channels or to the supplementary content in the supplementary channel.

40. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot having a two-dimensional region within one of said plurality of content channels, the hot spot being configured to be selectable by a user and an action being initiated upon selection of the hot spot by the user, wherein the action includes implementing a change to the supplementary content in the at least one supplementary channel.

41. A digital document comprising:
a plurality of content channels, each of the plurality of content channels configured to provide primaiy content and be selectable by a user during playback of the document, the primaiy content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
wherein one of said plurality of content channels is a map channel, the map channel being configured to present mapping objects within the map channel, at least one of the plurality of content channels configured as a mapping data content channel, the mapping objects being configured to be selectable by a user, the at least one mapping data content channel being configured to include mapping location data and mapping time data usable to present the mapping objects at a location and time within the map channel during document playback, the map channel being associated with the at least one mapping data content channel.

42. The digital document of claim 41 wherein selection of a mapping object by a user initiates an action.

43. The digital document of claim 42 wherein the action includes implementing a change to the primary content in a content channel.

44. The digital document of claim 41 wherein a mapping object changes location within the map channel during playback of the document.

45. The digital document of claim 41 wherein a mapping object includes a visual highlight mapping object which is selectable by a user.

46. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
wherein a first primary content associated with the plurality of content channels and a first supplementary content associated with the at least one supplementary channel is associated with a first scene, a second primary content associated with the plurality of content channels and a second supplementary content associated with the at least one supplementary channel is associated with a second scene, the second primary content and second supplementary content associated with the second scene simultaneously replacing the first primary content and first supplementary content associated with the first scene upon the occurrence of an event.

47. The digital document of claim 46 wherein the second primary content does not include content for all of the plurality of content channels, the first primary content associated with the first scene remaining in the content channels of the document during playback of the second scene for channels in which the second scene is not configured with content.

48. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection ofa content channel by a user during playback of the document, the plurality of content channels and at least one supplementary channel provided on a single page; and
wherein a user may enter annotative content to the primary content associated with one of the content channels during playback of the document, the annotative content having a content data element and a time data element, the annotative content saved as part of the document upon the termination of document playback, such that subsequent playback of the document displays the user-entered annotative content at the time of the content channel during playback that the annotative content was entered by the user.

49. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
wherein the primary content provided by each of said plurality of content channels is temporally synchronized and presents a video sequence that narrates a portion of a story, and wherein the supplementary content relating to the portion of the story is provided in the selected content channel.

50. A method for playback of a multi-channel digital document comprising:
(a) playback of primary content within a plurality of primary channels within the multi-channel document, including repeating playback of the primary content once the entire content has been played;
(b) receiving interactive input from a user, the input indicating a portion of the primary content has been selected;
(c) performing a resulting action in response to the user input received;
(d) repeating steps (a) through (c) until input terminating document playback is received from the user; and
(e) wherein the input includes selecting a mapping object within a map channel, and the resulting action includes providing resulting primary content in one of the plurality of primary channels.

51. A method for playback of a multi-channel digital document comprising:
(a) playback of primary content within a plurality of primary channels within the multi-channel document, including repeating playback of the primary content once the entire content has been played;
(b) receiving interactive input from a user, the input indicating a portion of the primary content has been selected;
(c) performing a resulting action in response to the user input received;
(d) repeating steps (a) through (c) until input terminating document playback is received from the user; and
(e) wherein the input includes providing annotation content at a user selected time during playback into an annotation enabled channel, the resulting action including saving the annotation content as part of the primary content associated with the annotation enabled channel.

52. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot including a two-dimensional region within one of said plurality of content channels, the hot spot being configured to be selectable by a user, and an action being initiated upon selection of the hot spot by the user, and wherein the two-dimensional region is selected from the group consisting of a circle and a rectangle wherein the supplementary content is associated with the primary content contained in one of the plurality of content channels and at a specified time during presentation of the primary content within the content channel, the supplementary content being displayable in the supplementary channel only when the content channel containing the primary content is selected at the specified time associated with the supplementary content.

53. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot being a two-dimensional region within one of said plurality of content channels, the hot spot being configured to be selectable by a user, and an action being initiated upon selection of the hot spot by the user, wherein the action includes an event scripted in a customized manner by an author.

54. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot including a two-dimensional region within one of said plurality of content channels, the hot spot being configured to be selectable by a user, an action being initiated upon selection of the hot spot by the user, and wherein the hot spot exists throughout a presentation of content associated with the one of said plurality of content channels wherein the supplementary content is associated with the primary content contained in one of the plurality of content channels and at a specified time during presentation of the primary content within the content channel, the supplementary content being displayable in the supplementary channel only when the content channel containing the primary content is selected at the specified time associated with the supplementary content.

55. A digital document comprising:
a plurality of content channels, each of the plurality of content channels configured to provide primary content and be selectable by a user during playback of the document, the primary content provided continuously in a looping manner until termination of document playback is initiated by a user input;
at least one supplementary channel configured to provide supplementary content upon the selection of a content channel by a user during playback of the document, the plurality of content channels and at least one supplementary channel provided on a single page; and
a hot spot, the hot spot including a two-dimensional region within one of said plurality of content channels, the hot spot being configured to be selectable by a user, an action being initiated upon selection of the hot spot by the user, and wherein the hot spot is time-based, the hot spot existing in one of said plurality of content channels for a period of time.

56. A digital document comprising:
a plurality of content channels, each of the plurality of content channels configured to provide primary content and be selectable by a user during playback of the document, the primary content provided continuously in a looping manner until termination of document playback is initiated by a user input;

at least one supplementary channel configured to provide supplementary content upon the selection of a content channel by a user during playback of the document, the plurality of content channels and at least one supplementary channel provided on a single page; and a hot spot, the hot spot including a two-dimensional region within one of said plurality of content channels, the hot spot being configured to be selectable by a user, an action being initiated upon selection of the hot spot by the user, and wherein the hot spot is a first hot spot and the two-dimensional region is a first two-dimensional region, and including a second hot spot, the second hot spot including a second two-dimensional region within the one of said plurality of content channels.

57. A digital document comprising:

a plurality of content channels, each of the plurality of content channels configured to provide primary content and be selectable by a user during playback of the document, the primary content provided continuously in a looping manner until termination of document playback is initiated by a user input;

at least one supplementary channel configured to provide supplementary content upon the selection of a content channel by a user during playback of the document, the plurality of content channels and at least one supplementary channel provided on a single page; and wherein one of said plurality of content channels is a map channel, the map channel configured to present mapping objects within the map channel, the mapping objects configured to be selectable by a user, the map channel associated with at least one mapping data content channel within the digital document, and the at least one mapping data content channel configured to include mapping data used to present the mapping objects within the map channel during document playback upon a document action.

58. A digital document comprising:

a plurality of content channels, each of the plurality of content channels configured to provide primary content and be selectable by a user during playback of the document, the primary content provided continuously in a looping manner until termination of document playback is initiated by a user input;

at least one supplementary channel configured to provide supplementary content upon the selection of a content channel by a user during playback of the document, the plurality of content channels and at least one supplementary channel provided on a single page; and wherein one of said plurality of content channels is a map channel, the map channel configured to present mapping objects within the map channel, the mapping objects configured to be selectable by a user, the map channel associated with at least one mapping data content channel within the digital document, the at least one mapping data content channel configured to include mapping location data and mapping time data used to present the mapping objects at a location and time within the map channel during document playback, and wherein each of the mapping objects is configured to initiate an action upon the selection of the mapping object by a user, and the action includes implementing a change to the primary content in a plurality of content channels.

* * * * *

UNITED STATES PATENT AND TRADEMARK OFFICE
CERTIFICATE OF CORRECTION

PATENT NO. : 7,062,712 B2 Page 1 of 1
APPLICATION NO. : 10/295396
DATED : June 13, 2006
INVENTOR(S) : Schneider et al.

It is certified that error appears in the above-identified patent and that said Letters Patent is hereby corrected as shown below:

On the Title page, and item 45

Item [*] Notice: Subject to any disclaimer, the term of this patent is extended or adjusted under 35 USC 254(b) by (0) days Delete the phrase "by 0 days" and insert -- by 107 days--

Signed and Sealed this

Sixteenth Day of January, 2007

JON W. DUDAS
*Director of the United States Patent and Trademark Office*